US011539897B2

(12) United States Patent
Qu et al.

(10) Patent No.: US 11,539,897 B2
(45) Date of Patent: Dec. 27, 2022

(54) SYSTEMS AND METHODS FOR EXPOSURE CONTROL

(71) Applicant: ZHEJIANG DAHUA TECHNOLOGY CO., LTD., Zhejiang (CN)

(72) Inventors: Erping Qu, Hangzhou (CN); Qianfeng Huang, Hangzhou (CN); Runfa Pan, Hangzhou (CN); Liangcheng Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 29 days.

(21) Appl. No.: 17/168,208

(22) Filed: Feb. 5, 2021

(65) Prior Publication Data

US 2021/0160417 A1 May 27, 2021

Related U.S. Application Data

(63) Continuation of application No. 16/395,615, filed on Apr. 26, 2019, now Pat. No. 10,924,684, which is a
(Continued)

(30) Foreign Application Priority Data

Oct. 26, 2016 (CN) .......................... 201610957318.8
Dec. 27, 2016 (CN) .......................... 201611229065.9

(51) Int. Cl.
*H04N 5/235* (2006.01)
*H04N 5/232* (2006.01)
(Continued)

(52) U.S. Cl.
CPC ........... *H04N 5/2353* (2013.01); *H04N 5/238* (2013.01); *H04N 5/2351* (2013.01);
(Continued)

(58) Field of Classification Search
CPC ............. H04N 5/2353; H04N 5/23245; H04N 5/2351; H04N 5/2352; H04N 5/238; H04N 5/243; H04N 5/235
See application file for complete search history.

(56) References Cited

U.S. PATENT DOCUMENTS 5,745,808 A   4/1998 Tintera
6,421,086 B1  7/2002 Kuno et al.
(Continued)

FOREIGN PATENT DOCUMENTS

CN   101247480 A   8/2008
CN   102665047 A   9/2012
(Continued)

OTHER PUBLICATIONS

International Search Report in PCT/CN2017/107431 dated Jan. 12, 2018, 4 pages.
(Continued)

*Primary Examiner* — Albert H Cutler
(74) *Attorney, Agent, or Firm* — Metis IP LLC

(57) ABSTRACT

The present disclosure relates to systems and methods for determining the exposure setting of an imaging device having a set of exposure parameters. A target luma of the imaging device may be determined. A correspondence table may be obtained. The correspondence table may relate to a plurality of reference luma values and a plurality of groups of operation values of the set of exposure parameters, a group of operation values corresponding to a reference luma value. A reference luma value and a group of operation values of the set of exposure parameters may be identified based on the target luma and the correspondence table. An adjustment of at least one exposure parameter of the imaging device may be determined based on the identified group of operation values. The at least one exposure parameter of the
(Continued)

imaging device may be adjusted based on the determined adjustment.

17 Claims, 13 Drawing Sheets

Related U.S. Application Data continuation of application No. PCT/CN2017/107431, filed on Oct. 24, 2017.

(51) Int. Cl.
    *H04N 5/238*     (2006.01)
    *H04N 5/243*     (2006.01)

(52) U.S. Cl.
    CPC ....... *H04N 5/2352* (2013.01); *H04N 5/23245* (2013.01); *H04N 5/243* (2013.01)

(56) References Cited

U.S. PATENT DOCUMENTS

| | | |
|---|---|---|
| 7,978,231 B2 | 7/2011 | Proca et al. |
| 8,810,715 B1 | 8/2014 | Rudin |
| 9,955,084 B1 | 4/2018 | Haynold |
| 2004/0119877 A1 | 6/2004 | Shinozaki |
| 2005/0264684 A1 | 12/2005 | Kamon et al. |
| 2006/0062484 A1 | 3/2006 | Aas et al. |
| 2006/0087581 A1* | 4/2006 | Lin ............ H04N 5/2356 396/237 |
| 2006/0182430 A1 | 8/2006 | Stavely et al. |
| 2006/0198627 A1 | 9/2006 | So |
| 2007/0024741 A1 | 2/2007 | Moriya et al. |
| 2009/0021603 A1 | 1/2009 | Hsieh |
| 2009/0115859 A1 | 5/2009 | Lee |
| 2009/0284616 A1 | 11/2009 | Daiku |
| 2010/0066858 A1 | 3/2010 | Asoma |
| 2010/0097492 A1 | 4/2010 | Ha et al. |
| 2010/0134650 A1 | 6/2010 | Kim et al. |
| 2011/0228128 A1 | 9/2011 | Ikeda |
| 2011/0249961 A1 | 10/2011 | Brunner |
| 2011/0261208 A1 | 10/2011 | Wang et al. |
| 2011/0293259 A1 | 12/2011 | Doepke et al. |
| 2012/0105668 A1 | 5/2012 | Velarde et al. |
| 2014/0307117 A1* | 10/2014 | Feng ............ H04N 5/2351 348/218.1 |
| 2015/0163414 A1 | 6/2015 | Nikkanen et al. |
| 2015/0181102 A1 | 6/2015 | Oda et al. |
| 2015/0237262 A1 | 8/2015 | Hamada et al. |
| 2016/0212316 A1 | 7/2016 | Nagashima |
| 2017/0374258 A1 | 12/2017 | Fujita et al. |
| 2018/0183987 A1 | 6/2018 | Tamura |

FOREIGN PATENT DOCUMENTS

| | | |
|---|---|---|
| CN | 103019026 A | 4/2013 |
| CN | 103546732 A | 1/2014 |
| CN | 102625048 B | 5/2014 |
| CN | 104917976 A | 9/2015 |
| CN | 105578042 A | 5/2016 |
| CN | 105635565 A | 6/2016 |
| CN | 105830424 A | 8/2016 |
| CN | 105915816 A | 8/2016 |
| CN | 106657801 A | 5/2017 |
| CN | 106686319 A | 5/2017 |
| CN | 107343157 A | 11/2017 |

OTHER PUBLICATIONS

Written Opinion in PCT/CN2017/107431 dated Jan. 12, 2018, 5 pages.
First Office Action in Chinese application No. 201611229065.9 dated Feb. 12, 2019, 9 pages.
Partial European Search Report in European Application No. 17865891.0 dated Sep. 2, 2019, 13 pages.
International Search Report in PCT/CN2017/116728 dated Feb. 24, 2018, 4 pages.
Written Opinion in PCT/CN2017/116728 dated Feb. 24, 2018, 5 pages.
Partial Supplementary European Search Report in European Application No. 17887589.4 dated Oct. 22, 2019, 14 pages.
The Extended European Search Report in European Application No. 17887589.4 dated Feb. 21, 2020, 14 pages.

\* cited by examiner

SYSTEMS AND METHODS FOR EXPOSURE CONTROL

CROSS-REFERENCE TO RELATED APPLICATIONS

This application is a Continuation of U.S. application Ser. No. 16/395,615, filed on Apr. 26, 2019, which is a Continuation of International Application No. PCT/CN2017/107431, filed on Oct. 24, 2017, which claims priority of Chinese Patent Application No. 201610957318.8 filed on Oct. 26, 2016 and Chinese Patent Application No. 201611229065.9 filed on Dec. 27, 2016, the entire contents of which are hereby incorporated by reference.

TECHNICAL FIELD

The present application generally relates to image acquisition, and more particularly, to systems and methods for determining exposure settings of an imaging device having a set of exposure parameters.

BACKGROUND

Exposure control is a widely used technique in image shooting. Conventionally, automatic exposure control may be performed based on a step-by-step technique. The step-by-step technique may take a long time and the control results may be unsatisfactory. Thus, it may be desirable to develop a system and method that may control exposure parameters of an image acquisition device automatically and efficiently.

SUMMARY

In a first aspect of the present disclosure, a system is provided. The system may include at least one processor and at least one non-transitory computer-readable storage medium storing a set of instructions, the set of instructions, when executed by the at least one processor, cause the system to perform the following operations. The system may determine a target luma of an imaging device, wherein the imaging device may have a set of exposure parameters. The system may obtain a correspondence table relating to a plurality of reference luma values and a plurality of groups of operation values of a set of exposure parameters of the imaging device, wherein a group of operation values of the set of exposure parameters of the imaging device may correspond to a reference luma value. The system may identify, based on the target luma and the correspondence table, a reference luma value, and a group of operation values with respect to the set of exposure parameters corresponding to the reference luma value. The system may determine, based on the group of operation values, an adjustment of at least one exposure parameter of the imaging device. The system may adjust, based on the determined adjustment, the at least one exposure parameter of the imaging device.

In a second aspect of the present disclosure, another system is provided. The system may include at least one processor and at least one non-transitory computer-readable storage medium storing a set of instructions, the set of instructions, when executed by the at least one processor, cause the system to perform the following operations. The system may identify a mode switch of an imaging device from a first exposure mode to a second exposure mode. The system may obtain a first correspondence table in the first exposure mode of the imaging device. The first correspondence table may relate to a plurality of reference luma values and a plurality of corresponding groups of operation values with respect to a set of exposure parameters of the imaging device. The system may obtain a second correspondence table in the second exposure mode of the imaging device. The second correspondence table may relate to a plurality of reference luma values and a plurality of corresponding groups of operation values with respect to the set of exposure parameters of the imaging device. The system may determine a current luma of the first exposure mode based on a current group of operation values with respect to the set of exposure parameters in the first exposure mode and the first correspondence table. The system may determine a target luma of the second exposure mode based on the current luma of the first exposure mode. The system may select a target group of operation values with respect to the set of exposure parameters of the second exposure mode based on the second correspondence table and the target luma of the second exposure mode. The system may adjust the imaging device based on the selected target group of operation values with respect to the set of exposure parameters of the second exposure mode.

In a third aspect of the present disclosure, a method is provided. The method may include one or more of the following operations. A target luma of an imaging device may be determined. The imaging device may have a set of exposure parameters. A correspondence table relating to a plurality of reference luma values and a plurality of groups of operation values of a set of exposure parameters of the imaging device may be obtained. A group of operation values of the set of exposure parameters of the imaging device may correspond to a reference luma value. A reference luma value and a group of operation values with respect to the set of exposure parameters corresponding to the reference luma value may be identified based on the target luma and the correspondence table. An adjustment of at least one exposure parameter of the imaging device may be determined based on the group of operation values. The at least one exposure parameter of the imaging device may be adjusted based on the determined adjustment.

In a fourth aspect of the present disclosure, a method is provided. The method may include one or more of the following operations. A mode switch of an imaging device from a first exposure mode to a second exposure mode may be identified. A first correspondence table in the first exposure mode of the imaging device may be obtained. The first correspondence table may relate to a plurality of reference luma values and a plurality of corresponding groups of operation values with respect to a set of exposure parameters of the imaging device. A second correspondence table in the second exposure mode of the imaging device may be obtained. The second correspondence table may relate to a plurality of reference luma values and a plurality of corresponding groups of operation values with respect to the set of exposure parameters of the imaging device. A current luma of the first exposure mode may be determined based on a current group of operation values with respect to the set of exposure parameters in the first exposure mode and the first correspondence table. A target luma of the second exposure mode may be determined based on the current luma of the first exposure mode. A target group of operation values with respect to the set of exposure parameters of the second exposure mode may be selected based on the second correspondence table and the target luma of the second exposure mode. The imaging device may be adjusted based on the selected target group of operation values with respect to the set of exposure parameters of the second exposure mode.

In a fifth aspect of the present disclosure, a non-transitory computer-readable storage medium is provided. The non-transitory computer-readable storage may include instructions. When the non-transitory computer-readable storage is accessed by at least one processor of an imaging device, the instructions may cause the imaging device to perform one or more of the following operations. The instructions may cause the imaging device to determine a target luma of the imaging device. The imaging device may have a set of exposure parameters. The instructions may cause the imaging device to obtain a correspondence table relating to a plurality of reference luma values and a plurality of sets of exposure parameters of the imaging device. The set of exposure parameters of the imaging device may correspond to a reference luma value. The instructions may cause the imaging device to identify a reference luma value and a group of operation values with respect to the set of exposure parameters corresponding to the reference luma value based on the target luma and the correspondence table. The instructions may cause the imaging device to determine an adjustment of at least one exposure parameter of the imaging device based on the group of operation values. The instructions may cause the imaging device to adjust the at least one exposure parameter of the imaging device based on the determined adjustment.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
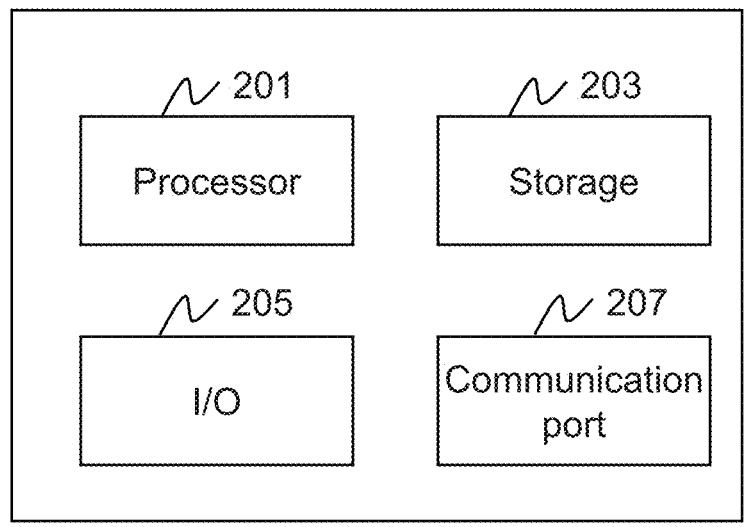
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provided herein relates to image acquisition. Specially, the present disclosure relates to systems and methods for determining exposure setting of an imaging device having a set of exposure parameters. According to some embodiments of the present disclosure, the method may include one or more following operations. A target luma of an imaging device may be determined, wherein the imaging device may have a set of exposure parameters. A correspondence table relating to a plurality of reference luma values and a plurality of groups of operation values of a set of exposure parameters of the imaging device may be obtained, wherein a group of operation values of the set of exposure parameters of the imaging device may correspond to a reference luma value. A reference luma value and a group of operation values with respect to the set of exposure parameters corresponding to the reference luma value may be identified based on the target luma and the correspondence table. An adjustment of at least one exposure parameter of the imaging device may be determined based on the group of operation values. The at least one exposure parameter of the imaging device may be adjusted based on the determined adjustment.

Figure 1:
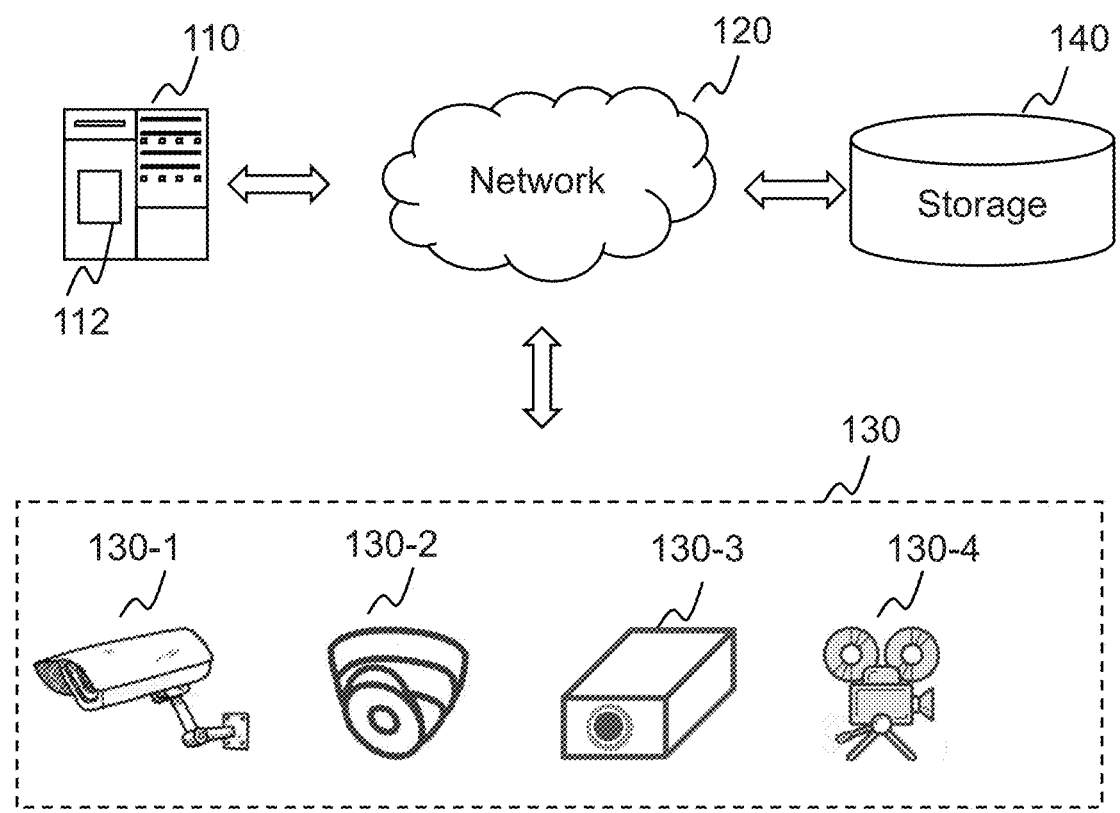
FIG. 1 is a schematic diagram of an exemplary image acquisition system according to some embodiments of the present disclosure.

FIG. 1 illustrates a schematic diagram of an exemplary image acquisition system 100 according to some embodiments of the present disclosure. As shown, the image acquisition system 100 may include a server 110, a network 120, an image acquisition device 130, and a storage 140. The image acquisition system 100 may be used in various fields including, for example, photography, filming, monitoring, and detection.

The server 110 may include a processing engine 112. The processing engine 112 may process information and/or data relating to the image acquisition system 100 to perform one or more functions described in the present disclosure. For example, the processing engine 112 may determine the current luma of an image obtained from the image acquisition device 130. As another example, the processing engine 112 may determine one or more exposure parameters of an exposure mode based on a target luma and a correspondence table including reference luma values and corresponding groups of operation values with respect to a set of exposure parameters. The correspondence table may be in the form of a table, or a drawing, etc. As used herein, luma may refer to the brightness of an image obtained by the image acquisition device 130. More descriptions regarding the current luma and the target luma may be found elsewhere in the present disclosure. See, e.g., FIG. 3 and the relevant descriptions.

In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 110 may be a single server, or a server group. The server group may be centralized, or distributed (e.g., server 110 may be a distributed system). In some embodiments, the server 110 may be local or remote. For example, the server 110 may access information and/or data stored in the image acquisition device 130, and/or the storage 140 via the network 120. As another example, the server 110 may be directly connected to the image acquisition device 130, and/or the storage 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

The network 120 may include any suitable network that can facilitate exchange of information and/or data for the image acquisition system 100. In some embodiments, one or more components in the image acquisition system 100 (e.g., the server 110, the image acquisition device 130, and the storage 140) may send information and/or data to other component(s) in the image acquisition system 100 via the network 120. For example, the server 110 may obtain/acquire an image from the image acquisition device 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

The image acquisition device 130 may be and/or include any suitable device that is capable of acquiring image data. Exemplary image acquisition device 130 may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device 130 may include a gun camera 130-1, a dome camera 130-2, an integrated camera 130-3, a binocular camera 130-4, a monocular camera, etc. In some embodiments, the camera may be a visible light camera or a thermal imaging camera.

Image data may include an image, or any data about an image, such as values of one or more pixels (or referred to as pixel values) of an image (e.g., luma, gray values, intensities, chrominance, contrast, etc. of one or more pixels of an image), audio information, timing information, location data, etc. In some embodiments, the image acquisition device 130 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

In some embodiments, the image acquisition device 130 may have one or more exposure modes. Exemplary exposure modes may include an auto exposure mode, a gain priority mode, a shutter priority mode, an aperture priority mode, an anti-ghosting mode, or the like, or any combination thereof. The image acquisition device 130 in different exposure modes may have the same operation values with respect to the exposure parameter(s) or different operation values with respect to the exposure parameter(s). Exemplary exposure parameters may include a gain, a shutter speed, an aperture size, a sensitivity to light, or the like, or any combination thereof. The exposure mode and the exposure parameter of the image acquisition device 130 may be set manually or automatically. Merely by way of example, the exposure mode of the image acquisition device 130 may be switched by a user. As another example, the image acquisition device 130 may adjust its exposure mode or the operation value(s) with respect to one or more exposure parameters automatically based on an environmental condition (e.g., the brightness, etc.) when taking a picture.

In some embodiments, the image acquisition device 130 may include a processing unit (not shown in FIG. 1). The processing unit may process information and/or data relating to the image acquisition device 130 to perform one or more functions described in the present disclosure. Merely by way of example, the processing unit may determine a current luma based on the operation value(s) of one or more exposure parameters and an exposure mode of the image acquisition device 130. As another example, the processing unit may determine the operation value(s) of one or more exposure parameters based on a target luma and a correspondence table of reference luma values and groups of operation values of a set of exposure parameters. In some embodiments, the processing unit may be implemented on a computing device 200 having one or more components illustrated in FIG. 2 in the present disclosure.

In some embodiments, the image data acquired by the image acquisition device 130 may be displayed on a terminal (not shown in FIG. 1). The terminal may include a tablet computer, a laptop computer, a mobile phone, a personal digital assistance (PDA), a smart watch, a point of sale (POS) device, a virtual reality (VR), an augmented reality (AR), an onboard computer, an onboard television, a wearable device, or the like, or any combination thereof.

The storage 140 may store data and/or instructions. The data and/or instructions may be obtained from, for example, the server 110, the image acquisition device 130, and/or any other component of the image acquisition system 100. In some embodiments, the data may include operation value(s) of one or more exposure parameters of an exposure mode, a correspondence table of reference luma values and corresponding groups of operation values with respect to a set of exposure parameters, a normalized correspondence table of reference luma values and corresponding groups of operation values with respect to the set of exposure parameters, a modified correspondence table of reference luma values and corresponding groups of operation values with respect to the set of exposure parameters, settings information (e.g., user setting information), image data about one or more images (e.g., image pixel values, time information, location information, etc.), or the like, or any combination thereof.

In some embodiments, the storage 140 may store data and/or instructions that the server 110 may execute or use to perform exemplary methods described in the present disclosure. In some embodiments, storage 140 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components in the image acquisition system 100 (e.g., the server 110, the image acquisition device 130, etc.). One or more components in the image acquisition system 100 may access the data or instructions stored in the storage 140 via the network 120. In some embodiments, the storage 140 may be directly connected to or communicate with one or more components in the image acquisition system 100 (e.g., the server 110, the image acquisition device 130, etc.). In some embodiments, the storage 140 may be part of the server 110 or the image acquisition device 130.

In some embodiments, one or more components in the image acquisition system 100 (e.g., the server 110, the image acquisition device 130, etc.) may have a permission to access the storage 140. In some embodiments, one or more components in the image acquisition system 100 may read and/or modify information relating to the image when one or more conditions are met. For example, the server 110 or the image acquisition device 130 may read and/or modify operation value(s) of one or more exposure parameters in various exposure modes.

It should be noted that the above description is merely provided for the purposes of illustration, and not intended to limit the scope of the present disclosure. For persons having ordinary skills in the art, multiple variations and modifications may be made under the teachings of the present disclosure. For example, the image acquisition system 100 may include one or more terminals. As another example, the processing engine 112 may be integrated into the image acquisition device 130. However, those variations and modifications do not depart from the scope of the present disclosure.

FIG. 2 is a schematic diagram illustrating exemplary hardware and/or software components of an exemplary computing device 200 on which the image acquisition system 100 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (e.g., program code) and perform functions of the image acquisition system 100 in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 201 may determine one or more exposure parameters of the image acquisition device 130. In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor may be described in the computing device 200. However, it should be noted that the computing device 200 in the present disclosure may also include multiple processors, and thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or vice versa, or the first and second processors jointly execute operations A and B).

The storage 203 may store data/information obtained from the server 110, the image acquisition device 130, and/or any other component of the image acquisition system 100. In some embodiments, the storage 203 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for the processing engine 112 for generating a correspondence table of reference luma values and corresponding groups of operation values with respect to a set of exposure parameters.

The I/O 205 may input and/or output signals, data, information, etc. In some embodiments, the I/O 205 may enable a user interaction with the processing engine 112. In some embodiments, the I/O 205 may include or communicate with an input device and an output device to facilitate a communication between the processing engine 112 and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 120) to facilitate data communications. The communication port 207 may establish connections between the server 110, the image acquisition device 130, and/or any other component of the image acquisition system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port. For example, the communication port 207 may be designed in accordance with the digital imaging and communications in medicine (DICOM) protocol.

Figure 3:
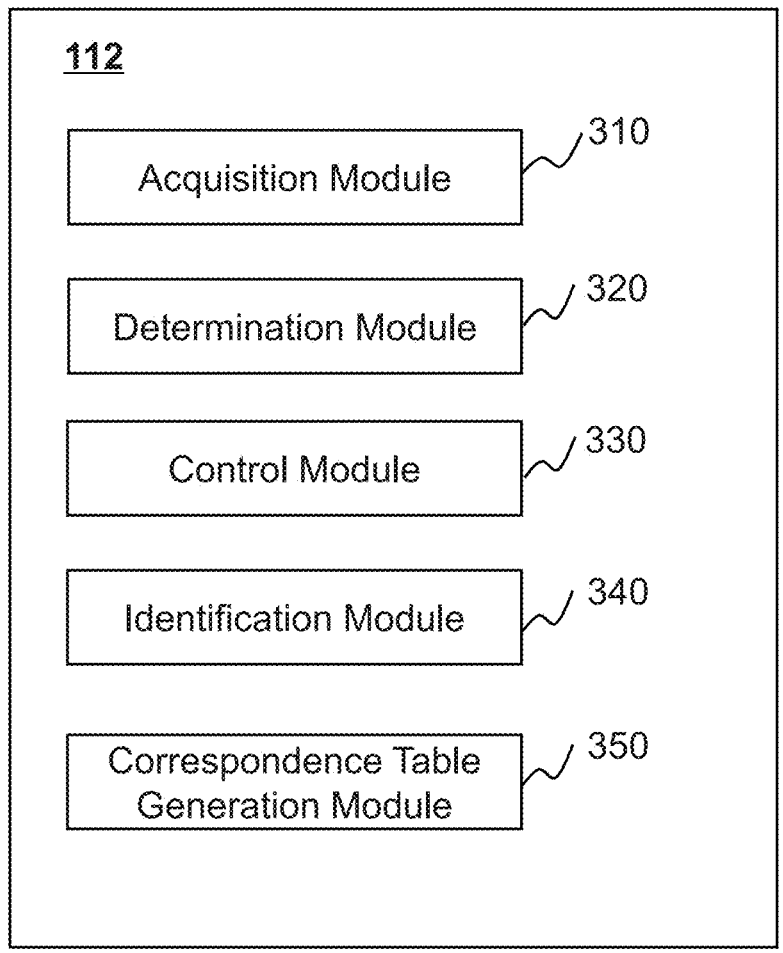
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 310, a determination module 320, a control module 330, an identification module 340, and a correspondence table generation module 350. At least two components in the processing engine 112 may be connected to or communicated with each other and/or other components in the image acquisition system 100, for example, the storage 140. In some embodiments, the processing engine 112 may be implemented on the computing device 200 illustrated in FIG. 2.

The acquisition module 310 may acquire data relating to the image acquisition system 100. The data may include one or more exposure parameters of an exposure mode, a correspondence table of reference luma values and corresponding groups of operation values with respect to a set of exposure parameters, settings information (e.g., user setting information), image data about one or more images (e.g., image pixel values, time information, location information, etc.), or the like, or any combination thereof. The data may be acquired from other components in the image acquisition system 100 (e.g., retrieved from the storage 140 or the image acquisition device 130 via the network 120), or generated by other components in the processing engine 112 (e.g., the determination module 320 and/or the correspondence table generation module 350).

The determination module 320 may determine a luma value, operation value(s) with respect to one or more exposure parameters, and/or other statistics relating to the image acquisition system 100. The luma value may include a current luma, a target luma, a reference luma, a luma range, or the like, or any combination thereof. As used herein, a current luma may be the current luma value of an image obtained by the image acquisition device 130. In some embodiments, the current luma of an image may be determined based on the exposure mode and the operation value(s) of one or more exposure parameters when the image is taken. For example, the current luma may be determined based on the operation values with respect to a set of exposure parameters of the image acquisition device 130 and a correspondence table of reference luma values and corresponding groups of operation values with respect to a set of exposure parameters.

A target luma may be a desired luma value of the image obtained by the image acquisition device 130. Merely by way of example, the quality of the image obtained by the image acquisition device 130 may be different when the luma is different. The quality of the image with the target luma may be higher than with any other possible luma value. As another example, the luma of the image obtained by the image acquisition device 130 may change when the exposure mode of the image acquisition device 130 is switched from a first exposure mode to a second exposure mode. In order to prevent a flicker of the scene, the target luma of the second exposure mode may be determined based on a current luma of the first exposure mode. A reference luma may be a reference value of the target luma in a correspondence table of reference luma values and corresponding groups of operation values with respect to a set of exposure parameters. In some embodiments, the reference luma may be a luma value in the correspondence table that has the smallest difference from the target luma among all reference luma values included in the correspondence table. A luma range may be a range of luma values corresponding to the adjustment(s) of the operation value(s) with respect to one or more exposure parameters of the image acquisition device 130.

The one or more exposure parameters may include a gain, a shutter speed, an aperture size, a sensitivity to light, or the like, or any combination thereof. In some embodiments, a group of operation values with respect to a set of exposure parameters corresponding to a reference luma value may be determined based on a correspondence table including reference luma values and corresponding groups of operation values of one or more sets of exposure parameters. In some embodiments, an adjustment of an exposure parameter of an imaging device may be determined. In some embodiments, an exposure parameter of an imaging device may be normalized with respect to a decibel (dB) value.

The determination module 320 may perform its functions based on one or more data analysis techniques. Exemplary data analysis techniques may include comparison, sorting, data association, calculation (e.g., summation, normalization, etc.), or the like, or any combination thereof.

The control module 330 may control operations of the image acquisition device 130 and/or other components of the processing engine 112 (e.g., the acquisition module 310, the determination module 320, etc.). For example, the control module 330 may control the image acquisition device 130 to switch an exposure mode or to adjust an exposure parameter. As another example, the control module 330 may control the acquisition module 310 to acquire an exposure parameter of an exposure mode, a correspondence table including reference luma values and corresponding groups of operation values of sets of exposure parameters, settings information, etc. As still another example, the control module 330 may receive a real-time command or retrieve a predetermined command provided by a user (e.g., a photographer) to control one or more operations of the image acquisition device 130, acquisition module 310, and/or the determination module 320.

The identification module 340 may identify an exposure mode switch of the image acquisition device 130. In some embodiments, once the identification module 340 identifies an exposure mode switch from a first exposure mode to a second exposure mode, it may notify the determination module 320 by, for example, sending a signal. The determination module 320 may then determine the operation value(s) of one or more exposure parameters of the second exposure mode.

The correspondence table generation module 350 may generate a correspondence table related to the image acquisition system 100. The correspondence table may include a correspondence table of reference luma values and corresponding groups of operation values of a set of exposure parameters, a modified correspondence table of reference luma values and corresponding groups of operation values of a set of exposure parameters, or the like, or any combination thereof. The correspondence table may record a relationship between reference luma values and corresponding groups of operation values of a set of exposure parameters in an exposure mode of the image acquisition device 130. In some embodiments, the correspondence table may be recorded in the form of a table, a drawing, etc. Merely by way of example, the correspondence table may record relationships between reference luma values and groups of operation values with respect to a set of exposure parameters including a gain, a shutter speed, and an aperture size, etc., in an auto exposure mode. The relationship in a correspondence table may be a one-to-one correspondence, a one-to-many correspondence, or a many-to-many correspondence.

The relationships between luma values and corresponding groups of operation values of one or more exposure parameters in different exposure modes may be the same as, or different from each other. More descriptions regarding the determination of the relationship between reference luma values and corresponding groups of operation values of a set of exposure parameters may be found elsewhere in the present disclosure. See, e.g., FIG. 6A, FIG. 7A, FIG. 8 and FIG. 9 and the relevant descriptions.

In some embodiments, the correspondence table may be modified based on, for example, setting information to generate a modified correspondence table. The setting information may include user setting information or setting information determined by one or more modules in the image acquisition system 100. More descriptions regarding the modified correspondence table may be found elsewhere in the present disclosure. See, e.g., FIG. 10 and the relevant descriptions.

In some embodiments, one or more modules illustrated in FIG. 3 may be implemented in at least part of the exemplary image acquisition system as illustrated in FIG. 1. For example, the one or more modules of the processing engine 112 may be integrated into the server 110. As another example, the processing engine 112 may be integrated into the image acquisition device 130.

It should be noted that the above descriptions of the processing engine 112 are merely provided for the purposes of illustration, and not intended to limit the scope of the present disclosure. For persons having ordinary skills in the art, various modifications and changes in the forms and details of the application of the above method and system may occur without departing from the principles in the present disclosure. For example, the processing engine 112 may include one or more other modules (e.g., a storage module to store data generated by the above modules). As another example, two or more of the modules may be combined into a single module, and any one of the modules may be divided into two or more units. In some embodiments, the acquisition module 310 and the determination module 320 may form a module to acquire and analyze data relating to the image acquisition system 100. However, those variations and modifications also fall within the scope of the present disclosure.

Figure 4:
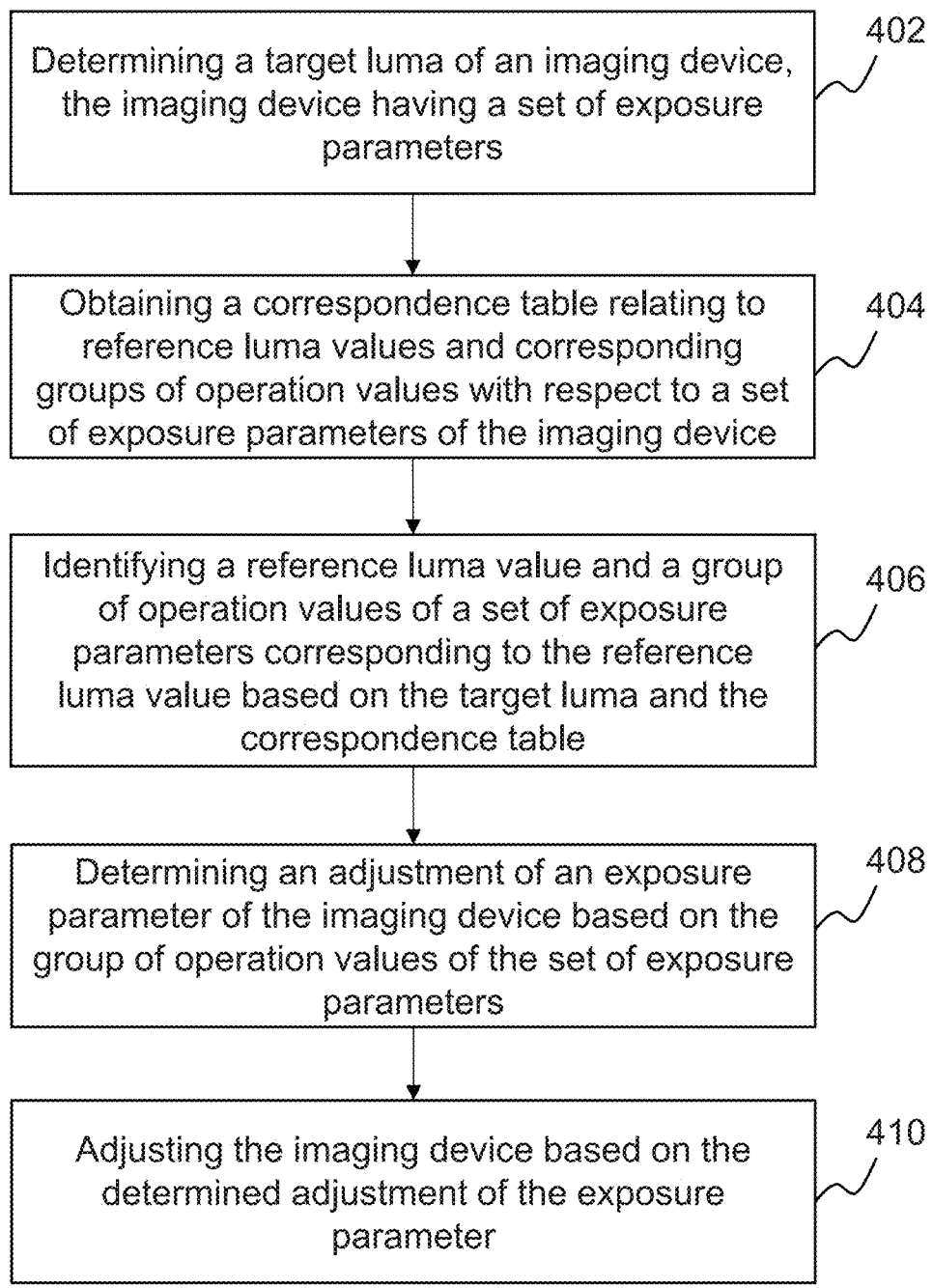
FIG. 4 is a flowchart of an exemplary process for controlling the exposure setting of an imaging device according to some embodiments of the present disclosure.

FIG. 4 is a flowchart illustrating an exemplary process for controlling an exposure setting of an imaging device according to some embodiments of the present disclosure. In some embodiments, at least part of process 400 may be performed by computing device 200 shown in FIG. 2.

In 402, a target luma of an imaging device may be determined. In some embodiments, the target luma of the imaging device may be determined. In some embodiments, the target luma may be determined by the determination module 320. The imaging device may be an image acquisition device (e.g., a digital camera, an analog camera, an IP camera (IPC), etc.) as described in FIG. 1. The imaging device may have a set of exposure parameters. The set of exposure parameters may include a gain, a shutter speed, an aperture size, a sensitivity to light, or the like, or any combination thereof. In some embodiments, the set of exposure parameters may include a gain, a shutter speed, and an aperture size. The target luma may be a desired luma of an image obtained by an image acquisition device in an exposure mode. In some embodiments, an exposure mode of the image acquisition device may be switched from a first exposure mode to a second exposure mode. The target luma of the second exposure mode may be determined based on a current luma of the first exposure mode. In some embodiments, the target luma may be a luma when the image has a high or a desirable quality among images taken by the image acquisition device under the same or similar condition. More descriptions regarding the current luma and/or the target luma of may be found elsewhere in the present disclosure. See, e.g., FIG. 1 and the relevant descriptions.

In 404, a correspondence table of reference luma values and corresponding groups of operation values with respect to a set of exposure parameters may be obtained. In some embodiments, the correspondence table may be obtained by the acquisition module 310 or generated by the correspondence table generation module 350. The correspondence table may record a relationship of reference luma values and groups of operation values of a set of exposure parameters of an exposure mode. In some embodiments, the correspondence table may record a relationship of reference luma values and groups of operation values of a set of exposure parameters of more than one exposure modes. The correspondence tables of different exposure modes may have a same set of exposure parameters or different sets of exposure parameters. In some embodiments, the correspondence table may be recorded in the form of a table, a drawing, etc. More descriptions regarding the correspondence table may be found elsewhere in the present disclosure. See, e.g., FIG. 3 and the relevant descriptions.

In 406, a reference luma value and a group of operation values of a set of exposure parameters corresponding to the reference luma value may be determined based on the target luma and the correspondence table. In some embodiments, the determination may be performed by the determination module 320. In some embodiments, the reference luma may be a luma value in the correspondence table that has the smallest difference from the target luma among all reference luma values included in the correspondence table.

In 408, an adjustment of an exposure parameter of the imaging device may be determined based on the group of operation values of the set of exposure parameters corresponding to the reference luma value. In some embodiments, the determination may be made by the determination module 320. The adjustment of the exposure parameter may be a difference between the operation value(s) of one or more exposure parameter(s) of the imaging device that may provide a first result (e.g., an image of a first luma) and the operation value(s) of the one or more parameter(s) that may provide a second result (e.g., an image of a second luma). In some embodiments, the exposure parameter to be adjusted may be at least one of a gain, a shutter speed, or an aperture size. In some embodiments, the adjustment may be needed to provide a different luma of an image captured by the imaging device in a same exposure mode. In some embodiments, the adjustment may be needed to provide a same or similar luma of an image captured by the imaging device in different exposure modes. In some embodiments, the adjustment may be needed to provide a different luma of an image captured by the imaging device in different exposure modes.

In 410, the imaging device may be adjusted based on the determined adjustment of the exposure parameter. In some embodiments, the determination may be made by the control module 330. Merely by way of example, an exposure time of the imaging device may be adjusted based on a determined adjustment with respect to the exposure time.

It should be noted that the above descriptions of process 400 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. For example, 402 and 404 may be performed at the same time. As another example, 404 may be performed before 402. As a further example, 408 and 410 may be integrated into an operation to adjust the imaging device based on the group of operation values of a set of exposure parameters. However, those variations and modifications also fall within the scope of the present disclosure.

Figure 5:
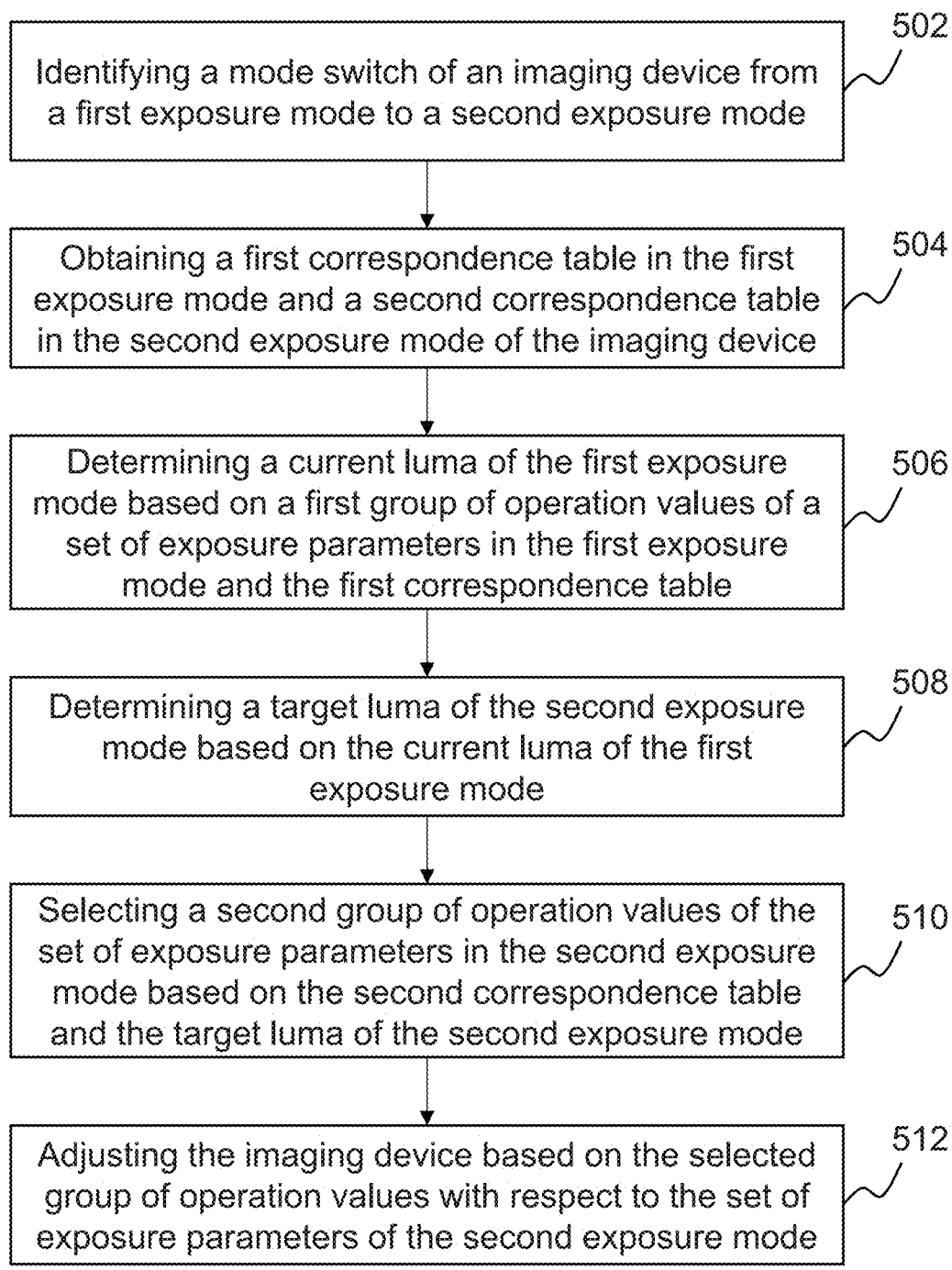
FIG. 5 is a flowchart of an exemplary process for controlling the exposure setting of an imaging device according to some embodiments of the present disclosure.

FIG. 5 is a flowchart illustrating an exemplary process for controlling the exposure setting of an imaging device according to some embodiments of the present disclosure. Process 500 may be an exemplary embodiment of process 400 as described in FIG. 4. In some embodiments, at least part of process 500 may be performed by computing device 200 shown in FIG. 2.

In 502, a mode switch of an imaging device from a first exposure mode to a second exposure mode may be identified. In some embodiments, the identification module 340 may identify the mode switch. The imaging device may be an image acquisition device (e.g., a digital camera, an analog camera, an IP camera (IPC), etc.) as described in FIG. 1. In some embodiments, the first exposure mode and the second exposure mode may be one of an auto exposure mode, a gain priority mode, a shutter priority mode, an aperture priority mode, respectively. The first exposure mode and the second exposure mode may be different from each other. Merely by way of example, the first exposure mode may be the auto exposure mode and the second exposure mode may be the gain priority mode.

In 504, a first correspondence table relating to the first exposure mode and a second correspondence table relating to the second exposure mode of the imaging device may be obtained. In some embodiments, the first correspondence table and/or the second correspondence table may be obtained by the acquisition module 310 or generated by the correspondence table generation module 350. The first corresponding table may include reference luma values and corresponding groups of operation values of a set of exposure parameters of the imaging device in the first exposure mode. The second corresponding table may include reference luma values and corresponding groups of operation values of a set of exposure parameters of the imaging device in the second exposure mode. More descriptions regarding the correspondence table of may be found elsewhere in the present disclosure. See, e.g., FIG. 3 and the relevant descriptions. More descriptions regarding the generation of a correspondence table between reference luma values and corresponding groups of operation values of a set of exposure parameters in an exposure mode may be found elsewhere in the present disclosure. See, e.g., FIG. 6A, FIG. 7A, FIG. 8, and FIG. 9 and the relevant descriptions.

In 506, a current luma of the first exposure mode may be determined based on a first group of operation values of a set of exposure parameters in the first exposure mode and the first correspondence table. In some embodiments, the current luma of the first exposure mode may be determined by the determination module 320. In some embodiments, the set of exposure parameters may include a gain, a shutter speed, and an aperture size of the imaging device in the first exposure mode.

In 508, a target luma of the second exposure mode may be determined based on the current luma of the first exposure mode. In some embodiments, the determination may be made by the determination module 320. In some embodiments, the target luma of the second exposure mode may be equal to or be slightly different from the current luma of the first exposure mode. As used herein, "slightly different" may indicate that an absolute value of a difference between the target luma of the second exposure mode and the current luma of the first exposure mode may be at most 1%, 3%, 5%, 8%, 10%, 12%, 15%, 18%, 20%, etc., of the current luma of the first exposure mode. In that way, the imaging device may switch from the first exposure mode to the second exposure mode without encountering a flicker.

In 510, a second group of operation values with respect to the set of exposure parameters in the second exposure mode may be selected based on the second correspondence table and the target luma of the second exposure mode. In some embodiments, the selection may be performed by the determination module 320. In some embodiments, the second group of operation values of the set of exposure parameters may be selected by identifying a reference luma value and a group of operation values of the set of exposure parameters corresponding to the reference luma value in the second correspondence table based on the target luma of the second exposure mode. For example, the reference luma value in the second correspondence table may be a luma value that has the smallest difference from the target luma of the second exposure mode among all reference luma values included in the second correspondence table.

In 512, the imaging device may be adjusted based on the selected group of operation values with respect to the set of exposure parameters of the second exposure mode. In some embodiments, the control module 330 may provide instructions that may cause the imaging device to be adjusted accordingly. Merely by way of example, the set of exposure parameters may include a gain, a shutter speed, and an aperture size. In some embodiments, at least one of the gain, the shutter speed, or the aperture size of the imaging device may be adjusted based on the selected group of operation values of the second exposure mode, respectively. Merely by way of example, an adjustment of each of the set of exposure parameters of the imaging device may first be determined based on the first group of operation values of the set of exposure parameters and the selected second group of operation values. The imaging device may then be adjusted based on the adjustment with respect to each exposure parameter. In some embodiments, the operation value of at least one exposure parameter of the set of exposure parameters may remain the same during the adjustment.

In some embodiments, the first group of operation values of the set of exposure parameters of the imaging device in the first exposure mode may include a first gain, a first shutter speed, and a first aperture size; the second group of operation values of the set of exposure parameters in the second exposure mode may include a second gain, a second shutter speed, and a second aperture size. The variations between the second group of operation values of the set of exposure parameters in the second exposure mode and the first group of operation values of the set of exposure parameters in the first exposure mode may correspond to a variation of the luma value. As used herein, a variation of an exposure parameter may be a ratio of the operation value of an exposure parameter of the second group (or referred to as a second operation value of an exposure parameter) to the operation value of the exposure parameter of the first group (or referred to as a first operation value of the exposure parameter), or a difference between these two operation values.

Merely by way of example, a first variable t, a second variable f, a third variable g, and a fourth variable i with respect to the variations of the shutter speed, the aperture size, the gain, and the luma, respectively, may be determined. The sum of t, f, and g may be equal to i. The first variable t, the second variable f, the third variable g, and the fourth variable i may be determined according to Equation (1), Equation (2), Equation (3), and Equation (4) below, respectively:

$$t = \text{found\_gain} \times \log_2(V_{sp}),  \quad (1)$$

$$f = \text{found\_gain} \times \log_2(V_{as}^2 \times \pi),  \quad (2)$$

$$g = V_g,  \quad (3)$$

$$i = \text{found\_gain} \times \log_2(V_l),  \quad (4)$$

where found_gain represents a reference value for measuring a variation of the gain, $V_{sp}$ refers to a ratio of the second shutter speed to the first shutter speed, $V_{as}$ refers to a ratio of the second aperture size to the first aperture size, $V_g$ refers to a difference between the second gain and the first gain, $V_l$ refers to a ratio of the target luma value of the second exposure mode and the current luma value of the first exposure mode. In some embodiments, the found_gain may be a reference value corresponding to a variation of the gain. For example, found_gain may be equal to 6 db representing that the operation value of the gain is twice a predetermined operation value. Taking Equation (1) as an example, if $V_{sp}$ is equal to 4, t may be equal to 12 representing that the operation value of the gain is 4 times the predetermined operation value. If $V_{sp}$ is equal to $2^{10}$, t may be equal to 60 representing that the operation value of the gain is $2^{10}$ times the predetermined operation value.

In some embodiments, found_gain may be equal to any positive value, such as 6 db, 10 db, etc. $V_l$ and i may be equal to 1 and 0, respectively, when the target luma of the second exposure mode is equal to the current luma value of the first exposure mode. In some embodiments, one of the exposure parameters of the second exposure mode may be determined based on the variations of the other two exposure parameters and a luma value. Merely by way of example, the second gain may be determined by subtracting the first variable t; the second variable f from the forth variable i. As an example illustrated in FIG. 7C, a second shutter speed of an imaging device in a gain priority mode may be determined according to Equation (5) below:

$$2^{(100.05-99.7)/6} * 0.03 \text{ milliseconds} = 0.0312 \text{ milliseconds}. \quad (5)$$

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. For example, 502 and 504 may be performed at the same time. As another example, 504 may be performed before 502. As a further example, 512 may be omitted. As a still further example, the set of the exposure parameters of the imaging device in the first exposure mode and the set of the exposure parameters of the imaging device in the second exposure mode may be different. However, those variations and modifications also fall within the scope of the present disclosure.

Figure 6A:
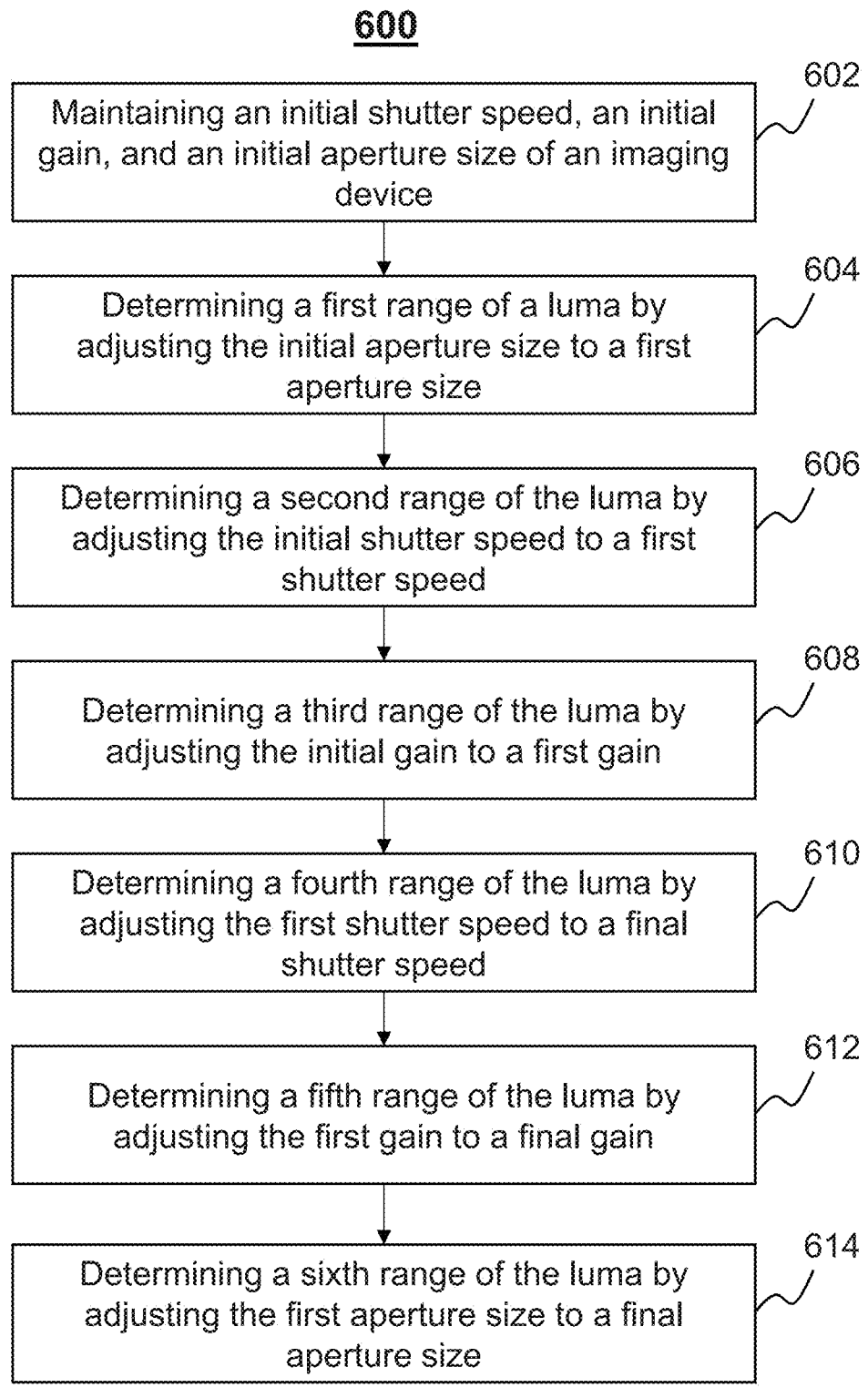
FIG. 6A is a flowchart illustrating an exemplary process for determining a correspondence table of reference luma values and groups of operation values with respect to a sets of exposure parameters in an auto exposure mode according to some embodiments of the present disclosure.

FIG. 6A is a flowchart illustrating an exemplary process for determining a correspondence table of reference luma values and groups of operation values with respect to a set of exposure parameters in an auto exposure mode according to some embodiments of the present disclosure. The set of exposure parameters may include a gain, a shutter speed, and an aperture size. In some embodiments, process 600 described with reference to FIG. 6A may be an exemplary process for achieving at least part of 504 shown in FIG. 5 when one of the first exposure mode and the second exposure mode is an auto exposure mode. In some embodiments, at least part of process 600 may be performed by computing device 200 shown in FIG. 2.

In 602, the initial operation values of the shutter speed, the gain, and the aperture size of an imaging device may be maintained. The initial operation value of an exposure parameter (e.g., the shutter speed, the gain, the aperture size) of an imaging device may be referred to as an initial exposure parameter (e.g., an initial shutter speed, an initial gain, an initial aperture size) of the imaging device. A first operation value of an exposure parameter (e.g., the shutter speed, the gain, the aperture size) of an imaging device may be referred to as a first exposure parameter (e.g., a first shutter speed, a first gain, a first aperture size) of the imaging device. In some embodiments, the maintenance of the operations values of these exposure parameters may be achieved according to instructions by the control module 330. The imaging device may be an image acquisition device (e.g., a digital camera, an analog camera, an IP camera (IPC), etc.) as described in FIG. 1. In some embodiments, the initial shutter speed may be the smallest shutter speed of the imaging device. The initial shutter speed may be any positive number. Merely by way of example, the initial shutter speed may be 0.03 millisecond, 0.06 millisecond, 10 milliseconds, or the like. In some embodiments, the initial gain may be the smallest gain of the imaging device. The initial gain may be any number equal to or greater than zero. Merely by way of example, the initial gain may be 0 decibel, 1 decibel, 40 decibels, or the like. In some embodiments, the initial aperture size may be the smallest aperture size of the imaging device. The initial aperture size may be any positive number. Merely by way of example, the initial aperture size may be F44, F7.82, F1.4, or the like.

In 604, a first range of a luma may be determined by adjusting the initial aperture size to a first aperture size. In some embodiments, the determination may be made by the determination module 320. The first aperture size may be any positive number greater than the initial aperture size and smaller than the largest aperture size of the imaging device. The smallest luma in the first range of luma may be the luma of an image obtained by the imaging device when it has the initial shutter speed, the initial gain, and the initial aperture size. The largest luma in the first range of luma may be the luma of the image obtained by the imaging device when it has the initial shutter speed, the initial gain, and the first aperture size. In other words, the smallest luma in the first range of luma may correspond to the initial shutter speed, the initial gain, and the initial aperture size in the correspondence table. The largest luma in the first range of luma may correspond to the initial shutter speed, the initial gain, and the first aperture size in the correspondence table.

In 606, a second range of the luma may be determined by adjusting the initial shutter speed to a first shutter speed. In some embodiments, the determination may be made by the determination module 320. The first shutter speed may be any positive number greater than the initial shutter speed and smaller than the largest shutter speed of the imaging device. The smallest luma in the second range of luma may be the luma of an image obtained by the imaging device when it has the initial shutter speed, the initial gain, and the first aperture size. The largest luma in the second range of luma may be the luma of the image obtained by the imaging device when it has the first shutter speed, the initial gain, and the first aperture size. In other words, the smallest luma in the second range of luma may correspond to the initial shutter speed, the initial gain, and the first aperture size in the correspondence table. The largest luma in the second range of luma may correspond to the first shutter speed, the initial gain, and the first aperture size in the correspondence table.

In 608, a third range of the luma may be determined by adjusting the initial gain to a first gain. In some embodiments, the determination may be made by the determination module 320. The first gain may be any positive number greater than the initial gain and smaller than the largest gain of the imaging device. The smallest luma in the third range of luma may be the luma of an image obtained by the imaging device when it has the first shutter speed, the initial gain, and the first aperture size. The largest luma in the third range of luma may be the luma of an image obtained by the imaging device when it has the first shutter speed, the first gain, and the first aperture size. In other words, the smallest luma in the third range of luma may correspond to the first shutter speed, the initial gain, and the first aperture size in the correspondence table. The largest luma in the third range of luma may correspond to the first shutter speed, the first gain, and the first aperture size in the correspondence table.

In 610, a fourth range of the luma may be determined by adjusting the first shutter speed to a final shutter speed. In some embodiments, the determination may be made by the determination module 320. The final shutter speed may be any positive number greater than the first shutter speed and equal to or smaller than the largest shutter speed of the imaging device. In some embodiments, the final shutter speed may be equal to the largest shutter speed of the imaging device.

In 612, a fifth range of the luma may be determined by adjusting the first gain to a final gain. In some embodiments, the determination may be made by the determination module 320. The final gain may be any positive number greater than the first gain and equal to or smaller than the largest gain of the imaging device. In some embodiments, the final gain may be equal to the largest gain of the imaging device.

In 614, a sixth range of the luma may be determined by adjusting the first aperture size to a final aperture size. In some embodiments, the determination may be made by the determination module 320. The final aperture size may be any positive number greater than the first aperture size and equal to or smaller than the largest aperture size of the imaging device. In some embodiments, the final aperture size may be equal to the largest aperture size of the imaging device.

Operations 610, 612, and 614 may be substantially similar to 606, 608, and 604, respectively, and are not repeated here.

Figure 6B:
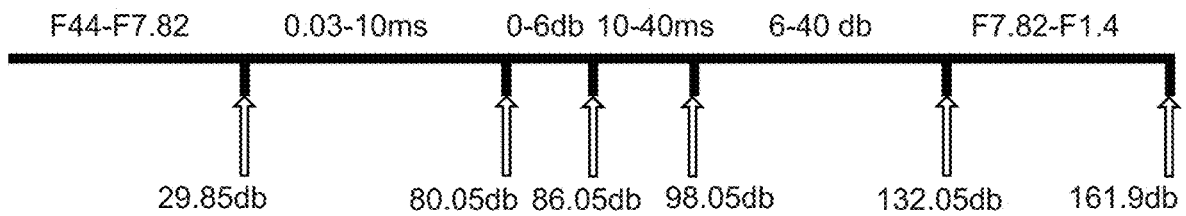
FIG. 6B illustrates a schematic diagram of exemplary relationships between reference luma values and corresponding groups of operation values of a set of exposure parameters of an imaging device in an auto exposure mode according to some embodiments of the present disclosure.

FIG. 6B illustrates a schematic diagram of relationships between reference luma values and corresponding groups of operation values of a set of exposure parameters of an exemplary imaging device in an auto exposure mode according to some embodiments of the present disclosure. The set of exposure parameters may include a gain, a shutter speed, and an aperture size. The relationships may be determined by way of implementing process 600A.

As shown in FIG. 6B, the smallest aperture size of the imaging device may be F44 and the largest aperture size may be F1.4. The smallest shutter speed of the imaging device may be 0.03 millisecond and the largest shutter speed may be 49 milliseconds. The smallest gain of the imaging device may be 0 decibel and the largest gain may be 40 decibels. The imaging device in an initial status may maintain the smallest aperture size, the smallest shutter speed, and the smallest gain.

A first range of luma may be determined by determined by adjusting an initial aperture size (i.e., F44 as shown in FIG. 6B) to a first aperture size (i.e., F7.82 as shown in FIG. 6B). The luma value of the imaging device may be 29.85 decibels when the aperture size, the shutter speed, and the gain are F7.82, 0.03 milliseconds, and 0 decibel, respectively.

A second range of the luma may be determined by adjusting an initial shutter speed (i.e., 0.03 decibel as shown in FIG. 6B) to a first shutter speed (i.e., 10 milliseconds as shown in FIG. 6B). The luma value of the imaging device may be 80.05 decibels when the aperture size, the shutter speed, and the gain are F7.82, 10 milliseconds, and 0 decibel, respectively.

A third range of the luma may be determined by adjusting the initial gain (i.e., 0 decibel as shown in FIG. 6B) to a first gain (i.e., 6 decibels as shown in FIG. 6B). The luma value of the imaging device may be 86.05 decibels when the aperture size, the shutter speed, and the gain are F7.82, 10 milliseconds, and 6 decibels, respectively.

A fourth range of the luma may be determined by adjusting the first shutter speed to a final shutter speed (i.e., 40 milliseconds as shown in FIG. 6B). The luma value of the imaging device may be 98.05 decibels when the aperture size, the shutter speed, and the gain are F7.82, 40 milliseconds, and 6 decibels, respectively.

A fifth range of the luma may be determined by adjusting the first gain to a final gain (i.e., 40 decibels as shown in FIG. 6B). The luma value of the imaging device may be 132.05 decibels when the aperture size, the shutter speed, and the gain are F7.82, 40 milliseconds, and 40 decibels, respectively.

A sixth range of the luma may be determined by adjusting the first aperture size to a final aperture size (i.e., F1.4 as shown in FIG. 6). The luma value of the imaging device may be 161.9 decibels when the aperture size, the shutter speed, and the gain are F1.4, 40 milliseconds, and 40 decibels, respectively.

It should be noted that the above example illustrated in FIG. 6B is provided for the purposes of illustration, and not intended to limit the scope of the present disclosure. The imaging device may have any initial exposure parameter (e.g., initial gain, etc.), any first exposure parameter (e.g., first gain, etc.), and any number of final exposure parameter (e.g., final gain, etc.). The relationships between luma values and corresponding groups of operation values of the exposure parameters of the imaging device may be different from the corresponding relationships as shown in FIG. 6B. Merely by way of example, the luma may be 30 decibels when the aperture size, the shutter speed, and the gain are F7.82, 0.03 millisecond, and 0 decibel, respectively. However, those variations and modifications also fall within the scope of the present disclosure.

Figure 7A:
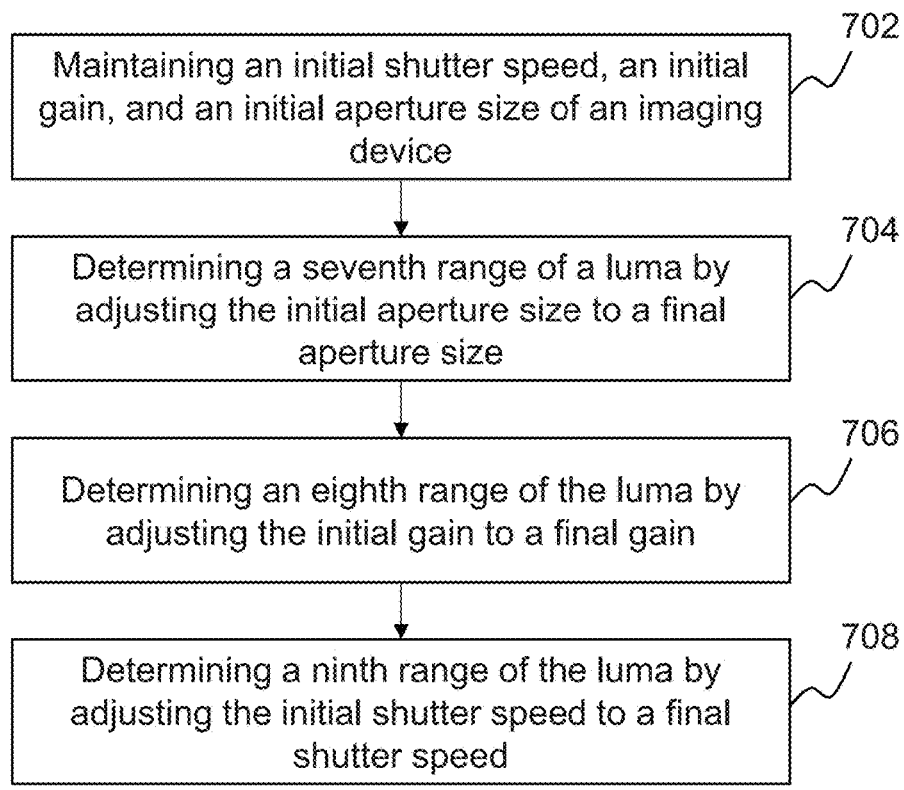
FIG. 7A is a flowchart illustrating an exemplary process for determining a correspondence table of reference luma values and groups of operation values with respect to a set of exposure parameters in a gain priority mode according to some embodiments of the present disclosure.

FIG. 7A is a flowchart illustrating an exemplary process for determining a correspondence table of reference luma values and groups of operation values of a set of exposure parameters in a gain priority mode according to some embodiments of the present disclosure. The set of exposure parameters may include a gain, a shutter speed, and an aperture size. In some embodiments, process 700 described with reference to FIG. 7A may be an exemplary process for achieving at least part of 504 shown in FIG. 5 when one of the first exposure mode and the second exposure mode is a gain priority mode. In some embodiments, at least part of process 700 may be performed by computing device 200 shown in FIG. 2.

In 702, an initial shutter speed, an initial gain, and an initial aperture size of an imaging device may be maintained. In some embodiments, the maintenance of the operations values of these exposure parameters may be achieved according to instructions by the control module 330. Operation 702 may be substantially similar to 602 with reference to FIG. 6A and is not repeated here.

In 704, a seventh range of a luma may be determined by adjusting the initial aperture size to a final aperture size. In some embodiments, the determination may be made by the determination module 320. The final aperture size may be any positive number greater than the initial aperture size and equal to or smaller than the largest aperture size of the imaging device. In some embodiments, the final aperture size may be equal to the largest aperture size of the imaging device.

In 706, an eighth range of the luma may be determined by adjusting the initial gain to a final gain. In some embodiments, the determination may be made by the determination module 320. The final gain may be any positive number greater than the initial gain and equal to or smaller than the largest gain of the imaging device. In some embodiments, the final gain may be equal to the largest gain of the imaging device.

In 708, a ninth range of the luma may be determined by adjusting the initial shutter speed to a final shutter speed. In some embodiments, the determination may be made by the determination module 320. The final shutter speed may be any positive number greater than the initial shutter speed and equal to or smaller than the largest shutter speed of the imaging device. In some embodiments, the final shutter speed may be equal to the largest shutter speed of the imaging device.

Operations 704, 706, and 708 may be substantially similar to 604, 608, and 606 with reference to FIG. 6A, respectively, and are not repeated here.

Figure 7B:
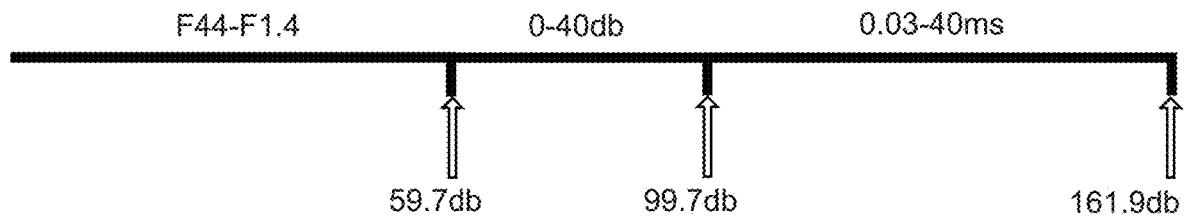
FIG. 7B illustrates a schematic diagram of exemplary relationships between luma values and groups of operation values with respect to a set of exposure parameters of an imaging device in a gain priority mode according to some embodiments of the present disclosure.

FIG. 7B illustrates a schematic diagram of relationships between reference luma values and groups of operation values of exposure parameters of an exemplary imaging device in a gain priority mode according to some embodiments of the present disclosure. The exposure parameters of the imaging device may include a gain, a shutter speed, and an aperture size. The relationships may be determined by way of implementing process 700A. The initial status of the imaging device in FIG. 7B may be substantially similar to the imaging device as shown in FIG. 6B, and is not repeated here.

A seventh range of luma may be determined by determined by adjusting an initial aperture size (i.e., F44 as shown in FIG. 7B) to a final aperture size (i.e., F1.4 as shown in FIG. 7B). The luma value of the imaging device may be 59.7 decibels when the aperture size, the shutter speed, and the gain are F1.4, 0.03 millisecond, and 0 decibel, respectively.

An eighth range of the luma may be determined by adjusting the initial gain (i.e., 0 decibel as shown in FIG. 7B) to a final gain (i.e., 40 decibels as shown in FIG. 7B). The luma value of the imaging device may be 99.7 decibels when the aperture size, the shutter speed, and the gain are F1.4, 0.03 millisecond, and 40 decibels, respectively.

A ninth range of the luma may be determined by adjusting an initial shutter speed (i.e., 0.03 as shown in FIG. 7B) to a final shutter speed (i.e., 40 milliseconds as shown in FIG. 7B). The luma value of the imaging device may be 161.9 decibels when the aperture size, the shutter speed, and the gain are F1.4, 40 milliseconds, and 40 decibels, respectively.

Figure 7C:
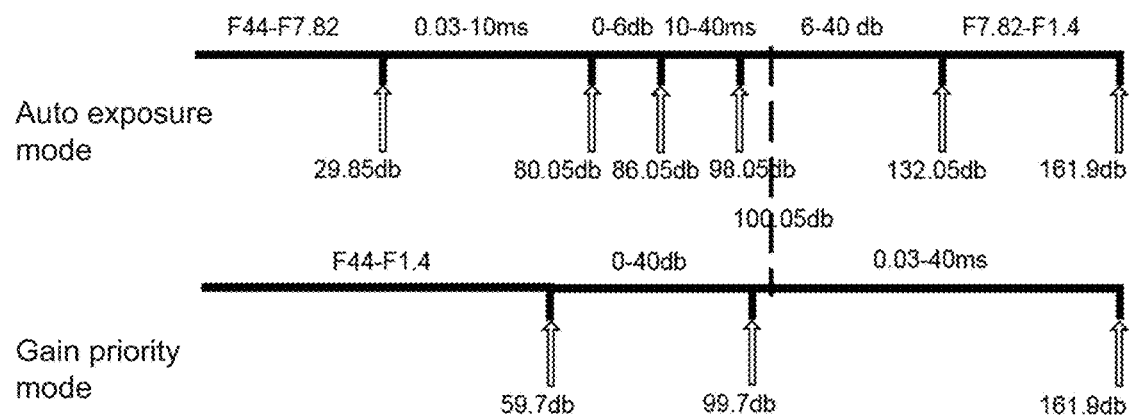
FIG. 7C illustrates a schematic diagram of exemplary relationships between reference luma values and groups of operation values with respect to a set of exposure parameters of an imaging device in an auto exposure mode and a gain priority mode.

FIG. 7C illustrates a schematic diagram of relationships between reference luma values and groups of operation values of a set of exposure parameters of an imaging device in an auto exposure mode and a gain priority mode. The relationships between reference luma values and groups of operation values of the set of exposure parameters in the auto exposure mode may be substantially similar to the corresponding relationships of the imaging device as shown in FIG. 6B, and are not repeated here. The relationships between reference luma values and groups of operation values of the set of exposure parameters in the gain priority mode may be substantially similar to the corresponding relationships of the imaging device as shown in FIG. 7B, and are not repeated here.

Merely by way of example, the exposure mode of the imaging device may be switched from the auto exposure mode and the gain priority mode. The adjustment of the operation values of a set of exposure parameters in the gain priority mode may be determined by the way of implementing processing 500 with reference to FIG. 5. A target luma of the gain priority mode may be determined based on a current luma of an image in the auto exposure mode. In some embodiments, the current luma of the image may be assessed or provided by the imaging device. A reference luma and a group of operation values of the set of exposure parameters corresponding to the reference luma of the gain priority mode may be determined based on the target luma and a correspondence table. The reference luma may be a luma value in the correspondence table that has the smallest difference from the target luma among all reference luma values of the imaging device. Merely by way of example, the current luma of an image in the imaging device may be 100.05 decibels when it switches its exposure mode from the auto exposure mode. The reference luma value corresponding to the target luma value may be 99.7 decibels as shown in FIG. 7C, that is the closest to the target luma of 100.05 decibels among the luma values included in the correspondence table. It should be noted that the above example is provided for the purposes of illustration, and not intended to limit the scope of the present disclosure. The imaging device in the gain priority mode may have any reference luma value and a group of operation values of a set of exposure parameters corresponding to the reference luma value.

Figure 8:
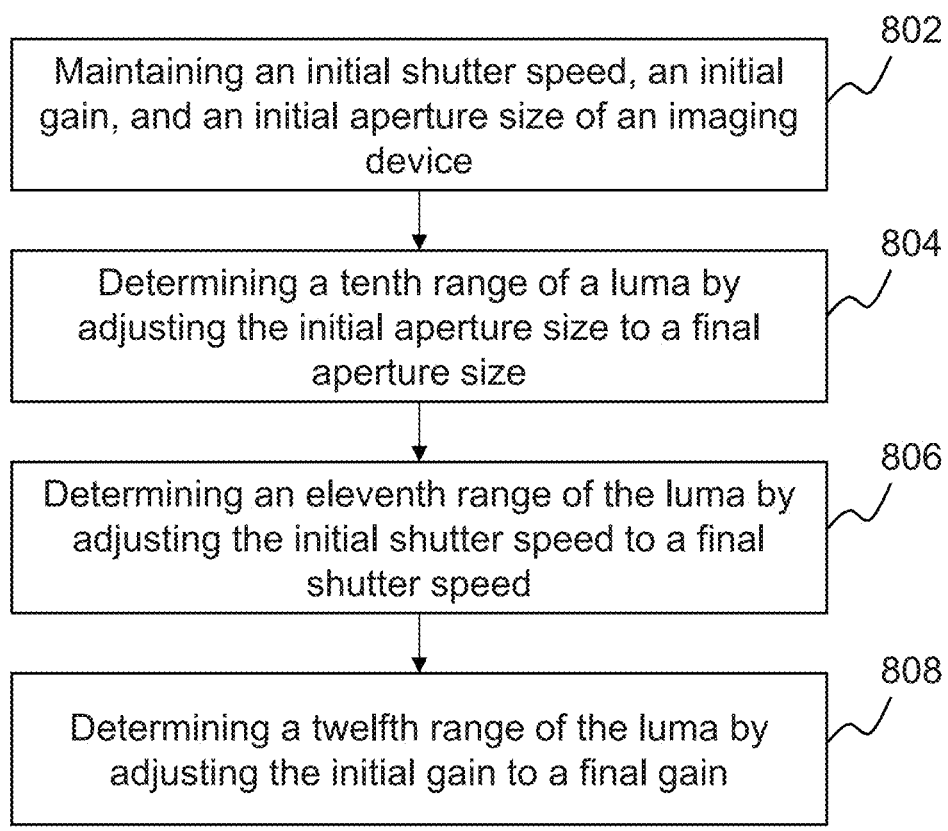
FIG. 8 is a flowchart illustrating an exemplary process for determining a correspondence table of reference luma values and groups of operation values with respect to a set of exposure parameters in a shutter priority mode according to some embodiments of the present disclosure.

FIG. 8 is a flowchart illustrating an exemplary process for determining a correspondence table of reference luma values and groups of operation values of a set of exposure parameters in a shutter priority mode according to some embodiments of the present disclosure. The set of exposure parameters may include a gain, a shutter speed, and an aperture size. In some embodiments, process 800 described with reference to FIG. 8 may be an exemplary process for achieving at least part of 504 shown in FIG. 5 when one of the first exposure mode and the second exposure mode a shutter priority mode. In some embodiments, at least part of process 800 may be performed by computing device 200 shown in FIG. 2.

In 802, an initial shutter speed, an initial gain, and an initial aperture size of an imaging device may be maintained. In some embodiments, the maintenance of the operations values of these exposure parameters may be achieved according to instructions by the control module 330. Operation 802 may be substantially similar to 602 with reference to FIG. 6A and is not repeated here.

In 804, a tenth range of a luma may be determined by adjusting the initial aperture size to a final aperture size. In some embodiments, the determination may be made by the determination module 320. In 806, an eleventh range of luma may be determined by adjusting the initial shutter speed to a final shutter speed. In some embodiments, the determination may be made by the determination module 320. In 808, a twelfth range of the luma may be determined by adjusting the initial gain to a final gain. In some embodiments, the determination may be made by the determination module 320. Operations 804, 806, and 808 may be substantially similar to 704, 708, and 706 with reference to FIG. 7A, respectively, and are not repeated here.

Figure 9:
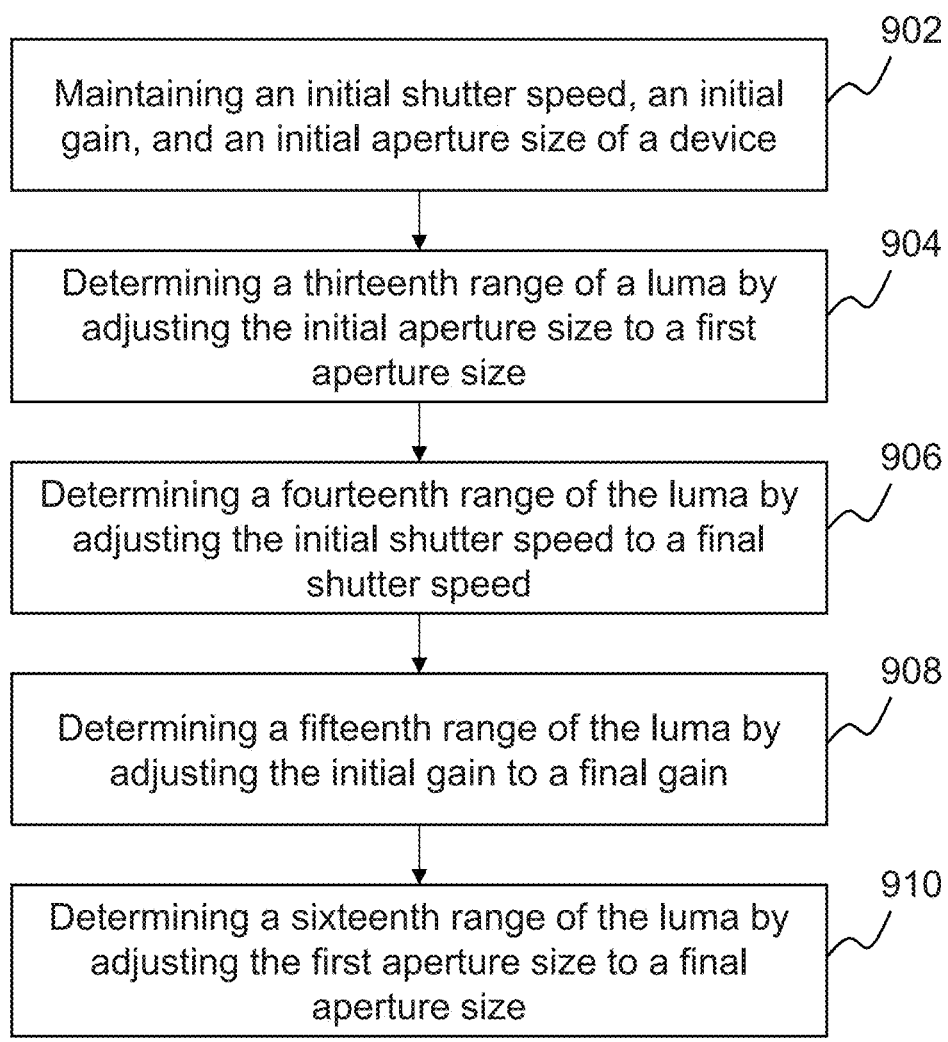
FIG. 9 is a flowchart illustrating an exemplary process for determining a correspondence table of reference luma values and groups of operation values with respect to a set of exposure parameters in an aperture priority mode according to some embodiments of the present disclosure.

FIG. 9 is a flowchart illustrating an exemplary process for determining a correspondence table of reference luma values and corresponding groups of operation values of a set of exposure parameters in an aperture priority mode according to some embodiments of the present disclosure. The set of exposure parameters may include a gain, a shutter speed, and an aperture size. In some embodiments, process 900 described with reference to FIG. 9 may be an exemplary process for achieving at least part of 504 shown in FIG. 5 when one of the first exposure mode and the second exposure mode is an aperture priority mode. In some embodiments, at least part of process 900 may be performed by computing device 200 shown in FIG. 2.

In 902, an initial shutter speed, an initial gain, and an initial aperture size of an imaging device may be maintained. In some embodiments, the maintenance may be made by the determination module 320. Operation 902 may be substantially similar to 602 with reference to FIG. 6A and is not repeated here.

In 904, a thirteenth range of a luma may be determined by adjusting the initial aperture size to a first aperture size. In some embodiments, the determination may be made by the determination module 320. Operation 902 may be substantially similar to 604 with reference to FIG. 6A and is not repeated here. In 906, a fourteenth range of the luma may be determined by adjusting the initial shutter speed to a final shutter speed. In some embodiments, the determination may be made by the determination module 320. In 908, a fifteenth range of the luma may be determined by adjusting the initial gain to a final gain. In some embodiments, the determination may be made by the determination module 320. In 910, a sixteenth range of the luma may be determined by adjusting the first aperture size to a final aperture size. In some embodiments, the determination may be made by the determination module 320. Operations 906, 908, and 910 may be substantially similar to 708, 706, and 704 with reference to FIG. 7A, respectively, and are not repeated here.

Figure 10:
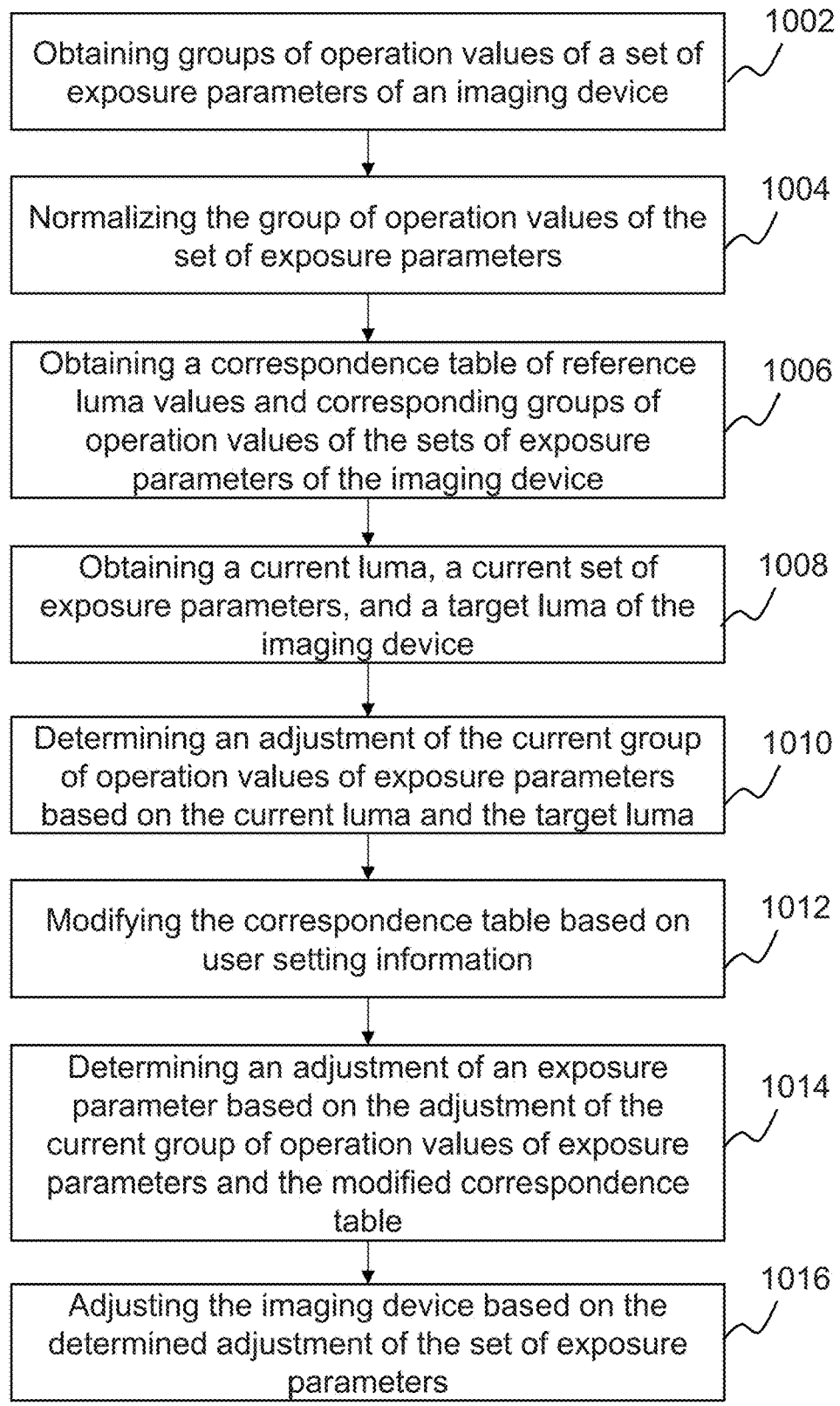
FIG. 10 is a flowchart illustrating an exemplary process for controlling the exposure setting of an imaging device according to some embodiments of the present disclosure.

FIG. 10 is a flowchart illustrating an exemplary process for controlling the exposure setting of an imaging device according to some embodiments of the present disclosure. Process 1000 may be an exemplary embodiment of process 400 as described in FIG. 4. In some embodiments, at least part of process 1000 may be performed by computing device 200 shown in FIG. 2.

In 1002, groups of operation values of a set of exposure parameters of an imaging device may be obtained. In some embodiments, the groups of operation values of a set of exposure parameters of an imaging device may be obtained by the acquisition module 310. In some embodiments, the set of exposure parameters may include a gain, a shutter speed, and an aperture size.

In 1004, the groups of operation values of the set of exposure parameters of the imaging device may be normalized. In some embodiments, the normalization may be performed by the determination module 320. In some embodiments, an operation value with respect to an exposure parameter of the imaging device may be normalized with respect to a dB value. For example, a relationship between the operation value of an exposure parameter and the dB value may be obtained from storage 140. The operation value of an exposure parameter in a group may be normalized based on the relationship between the operation value of the exposure parameter and the dB value. As another example, an experimental environment with a constant light source may be established. The imaging device may be maintained in an initial status with respect to each exposure parameter maintaining its initial value (e.g., the smallest value among the variation range of the exposure parameter, etc.). Each exposure parameter may then be adjusted from its initial operation value to a final operation value (e.g., the largest value among the variation range of the exposure parameter, etc.) and the corresponding luma value of the imaging device may be recorded. The dB value of each exposure parameter may be determined based on the corresponding luma value. In some embodiments, the other exposure parameters may be maintained at suitable values when an exposure parameter is adjusted to determine the relationship between the operation value of the exposure parameter and the dB value. For example, before the relationship between the operation value of the shutter speed and the dB value is determined, the shutter speed may be maintained in its initial operation value, and the gain and the aperture size may be adjusted to suitable values such that the luma value reaches a desirable value (e.g., 10% of the largest luma value allowed by the imaging device). During the determination of the relationship between the operation value of the shutter speed and the dB value, the shutter speed of the imaging device may be adjusted from its initial operation value to the other operation values spanning a full range in which the operation values of the shutter speed is allowed to vary, and the gain and the aperture size may be maintained at their suitable values determined previously to provide a desirable luma value.

In some embodiments, a set of exposure parameters of an imaging device may include a gain, a shutter speed, and an aperture size of the imaging device. The imaging device may be maintained in an initial status with its smallest gain, smallest shutter speed, and smallest aperture size. The shutter speed of the imaging device may be adjusted from the smallest shutter speed to the largest shutter speed, and the corresponding luma value may be recorded. The dB value of the shutter speed may be determined based on the corresponding luma value. The dB values of the gain and the aperture size may then be determined, successively. The determinations of the dB values of the gain and the aperture size may be substantially similar with the shutter speed, and are not repeated here.

In 1006, a correspondence table of reference luma values and corresponding groups of operation values of the set of exposure parameters of an imaging device may be obtained. In some embodiments, the obtainment may be made by the acquisition module 310. The correspondence table may record a relationship between reference luma values and corresponding groups of operation values of the set of exposure parameters of the imaging device. In some embodiments, the correspondence table may be recorded in the form of a table, a drawing, etc. In some embodiments, the imaging device may have one or more exposure modes. The correspondence tables relating to different exposure modes may be the same or different. More descriptions regarding the correspondence table may be found elsewhere in the present disclosure. See, e.g., FIG. 3 and the relevant descriptions.

Table 1 illustrates a schematic table of exemplary groups of operation values of a set of exposure parameters of an exemplary imaging device in a shutter speed priority mode. As shown in Table 1, the set of exposure parameters of the imaging device includes a gain, a shutter speed, and an aperture size. The imaging device may have 1000 lines of shutter speed. The variation range of the gain of the imaging device may be 0 gain step to 1023 gain steps. A gain step may be equal to, for example, 0.5 db. The variation range of the aperture size may be 0 aperture step to 100 aperture steps. It should be noted that the above example is provided for the purposes of illustration, and not intended to limit the scope of the present disclosure. The imaging device in the shutter priority mode may have a plurality of groups of operation values with respect to a set of exposure parameters.

TABLE 1

Exemplary groups of operation values of a set of exposure parameters of an exemplary imaging device in a shutter speed priority mode

| Shutter speed (1-1000) | Gain (0-1023) | Aperture size (0-100) |
|---|---|---|
| 1 | 0 | 90 |
| 1000 | 0 | 90 |
| 1000 | 1023 | 90 |

In 1008, a current luma, a current set of exposure parameters, and a target luma of the imaging device may be obtained. In some embodiments, these data may be obtained by the acquisition module 310. The current luma may be the current luma value of an image obtained by the imaging device. The target luma may be the luma value when the image has a high or a desirable quality among all possible luma values of images taken by the imaging device under the same or similar condition. More descriptions regarding the current luma and the target luma of may be found elsewhere in the present disclosure. See, e.g., FIG. 3 and the relevant descriptions. In some embodiments, the current luma may be determined based on the current group of operation values of a set of exposure parameters of the imaging device and a correspondence table.

In 1010, an adjustment of the current group of operation values of exposure parameters may be determined based on the current luma and the target luma. In some embodiments, the determination may be made by the determination module 320. In some embodiments, the adjustment may be needed due to a difference between the target luma and the current luma of the imaging device.

In 1012, the correspondence table of reference luma values and corresponding groups of operation values of the set of exposure parameters of the imaging device may be modified based on, for example, setting information. In some embodiments, the modification may be performed by the determination module 320. The setting information may include an operation value of an exposure parameter, a variation range of an exposure parameter, or the like, or any combination thereof. The groups of operation values of the set of exposure parameters in the correspondence table may be modified accordingly. In some embodiments, the setting information may be obtained from the storage 140, or be received by the imaging device from a user.

Table 2 illustrates a schematic table of exemplary modified groups of operation values of a set of exposure parameters of an exemplary imaging device in a shutter speed priority mode. The set of exposure parameters of the imaging device in the shutter speed priority mode may be substantially similar with those of the imaging device as illustrated in Table 1. Purely for illustration purposes, assuming that the setting information may include a variation range of the shutter speed and a variation range of the gain. The variation range of the shutter speed may be [1, 300]. The variation range of the gain may be [0, 350]. The groups of operation values of the set of exposure parameters illustrated in Table 1 may be modified to the groups of operation values of the set of exposure parameters illustrated in Table 2 according to the setting information. It should be noted that the above example is provided for the purposes of illustration, and not intended to limit the scope of the present disclosure. The setting information may include any variation range of any exposure parameter.

TABLE 2

Exemplary modified groups of operation values of a set of exposure parameters of an exemplary imaging device in a shutter speed priority mode

| Shutter speed (1-1000) | Gain (0-1023) | Aperture size (0-100) | Total normalized value |
|---|---|---|---|
| 1 | 0 | 90 | 1 |
| 300 | 0 | 90 | 20 |
| 300 | 350 | 90 | 35 |

In 1014, an adjustment of an exposure parameter of the imaging device may be determined based on the adjustment of the current group of operation values of exposure parameters and the modified correspondence table. In some embodiments, the determination may be made by the determination module 320. In some embodiments, the operation value of an exposure parameter to be adjusted may first be identified and an adjustment thereof may then be determined. More descriptions regarding the determination of the adjustment of the exposure parameter may be found elsewhere in the present disclosure. See, e.g., FIG. 11 and the relevant descriptions.

In 1016, the imaging device may be adjusted based on the determined adjustment of the exposure parameter. In some embodiments, the adjustment may be made according to instructions from the control module 330.

It should be noted that the above descriptions of process 1000 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. For example, 1010 and 1004 may be performed at the same time. As another example, 1010 may be performed before 1004. As a further example, 1012 may be omitted and an adjustment of an exposure parameter based on the adjustment of the current group of operation values of exposure parameters and the correspondence table. However, those variations and modifications also fall within the scope of the present disclosure.

Figure 11:
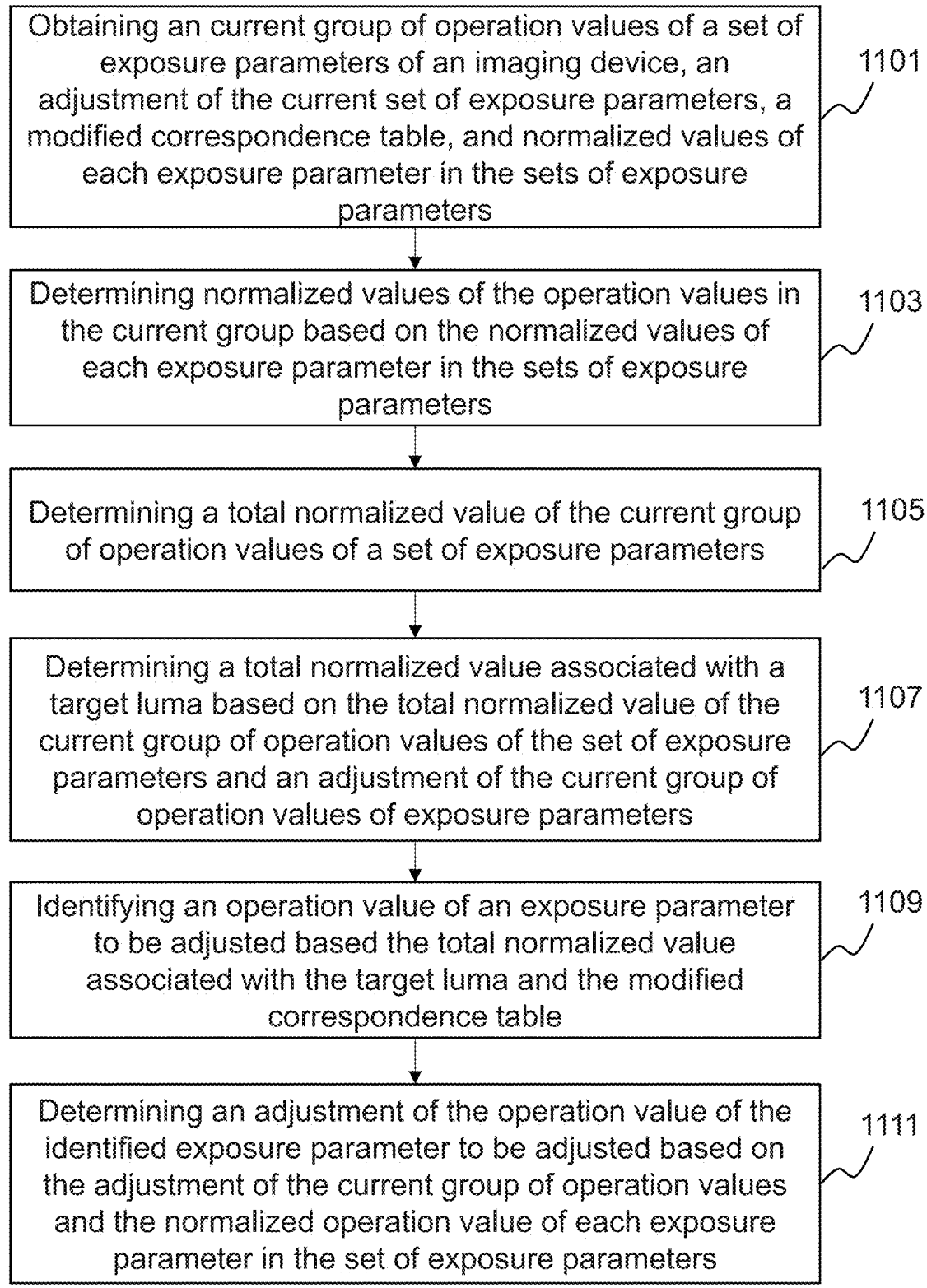
FIG. 11 is a flowchart illustrating an exemplary process for determining an adjustment of an exposure parameter according to some embodiments of the present disclosure.

FIG. 11 is a flowchart illustrating an exemplary process for determining an adjustment of an exposure parameter according to some embodiments of the present disclosure. In some embodiments, process 1100 described with reference to FIG. 11 may be an exemplary process for achieving at least part of 1014 shown in FIG. 10. In some embodiments, at least part of process 1100 may be performed by computing device 200 shown in FIG. 2.

In 1101, a current group of operation values of a set of exposure parameters of an imaging device, an adjustment of the current group of operation values of the set of exposure parameters, a modified correspondence table of reference luma values and groups of operation values of a set of exposure parameters of the imaging device, and normalized operation values of the current group may be obtained. In some embodiments, the data may be obtained by the acquisition module 310. The current group of operation values of a set of exposure parameters may be associated with a current luma. The adjustment of the set of exposure parameters from the current group of operation values may be due to, e.g., a difference between the target luma value and the current luma value. The obtainment of the adjustment of the current group of operation values, the modified correspondence table, and the normalized operation values of the current group may be referred back to FIG. 10.

In 1103, normalized values of the operation values in the current group may be determined based on the normalized values of each exposure parameter in the sets of exposure parameters. In some embodiments, the normalized values may be determined by the determination module 320. In some embodiments, the normalization may be performed with respect to dB values corresponding to the operation values in the current group.

In 1105, a total normalized value of the current group of operation values of a set of exposure parameters may be determined. In some embodiments, the determination may be made by the determination module 320. In some embodiments, the total normalized value may be determined by summing up the normalized values of the current group of operation values of the set of exposure parameters.

In 1107, a total normalized value associated with a target luma may be determined based on the total normalized value of the current group of operation values of the set of exposure parameters and an adjustment of the current group of operation values of exposure parameters. In some embodiments, the determination may be made by the determination module 320. The total normalized value associated the target luma may be determined by summing up the total normalized values of the current group of operation values of the set of exposure parameters and the adjustment of the current group of operation values of the set of exposure parameters.

In 1109, the adjustment of an operation value of an exposure parameter may be determined based on the total normalized value associated with the target luma and the modified correspondence table. In some embodiments, the determination may be made by the determination module 320. In some embodiments, total normalized value of each group of operation values of the set of exposure parameters in the correspondence table may first be determined based on the normalized values of the operation values of the group. The group of operation values with respect to the set of exposure parameters associated with the target luma may be selected from the correspondence table. The group of operation values of the set of exposure parameters associated with the target luma may be the set whose total normalized value is closest to the total normalized value associated with the target luma among the groups in the correspondence table. The exposure parameter to be adjusted may be the exposure parameter whose operation value in the identified group is different from the operation value of the exposure parameter in the current group.

Merely by way of example, a set of exposure parameters may include a gain, a shutter speed, and an aperture size as shown in Table 2. The total normalized value of a group of operation values of the set of exposure parameters may be determined by summing up the dB values of the shutter speed, the normalized value of the gain, and the normalized value of the aperture size of the group. Purely for illustration purposes, assuming that the current set of exposure parameters includes 300 shutter speed, 0 gain, and 90 aperture size, then the total normalized value of the current group of operation values of the set of exposure parameters may be 20 as illustrated in Table 2; assuming that the total normalized value associated with the target luma is 35, the group of operation value of the set of exposure parameters whose total normalized value is nearest 35 may be 300 lines, 350 gain, and 90 aperture size. Accordingly, the exposure parameter to be adjusted may be the gain of the imaging device.

In 1111, an adjustment of the operation value of the identified exposure parameter to be adjusted may be determined based on the adjustment of the current group of operation values and the normalized operation value of each exposure parameter in the set of exposure parameters. In some embodiments, the determination may be made by the determination module 320. Merely by way of example, the gain may be the identified exposure parameter to be adjusted. The adjustment of the current group of operation values of the set of exposure parameters may be 5 decibels. The adjustment of the gain may be the corresponding gain of 5 decibels determined based on the normalized value of the operation value of each exposure parameter in the set of exposure parameters.

Figure 12:
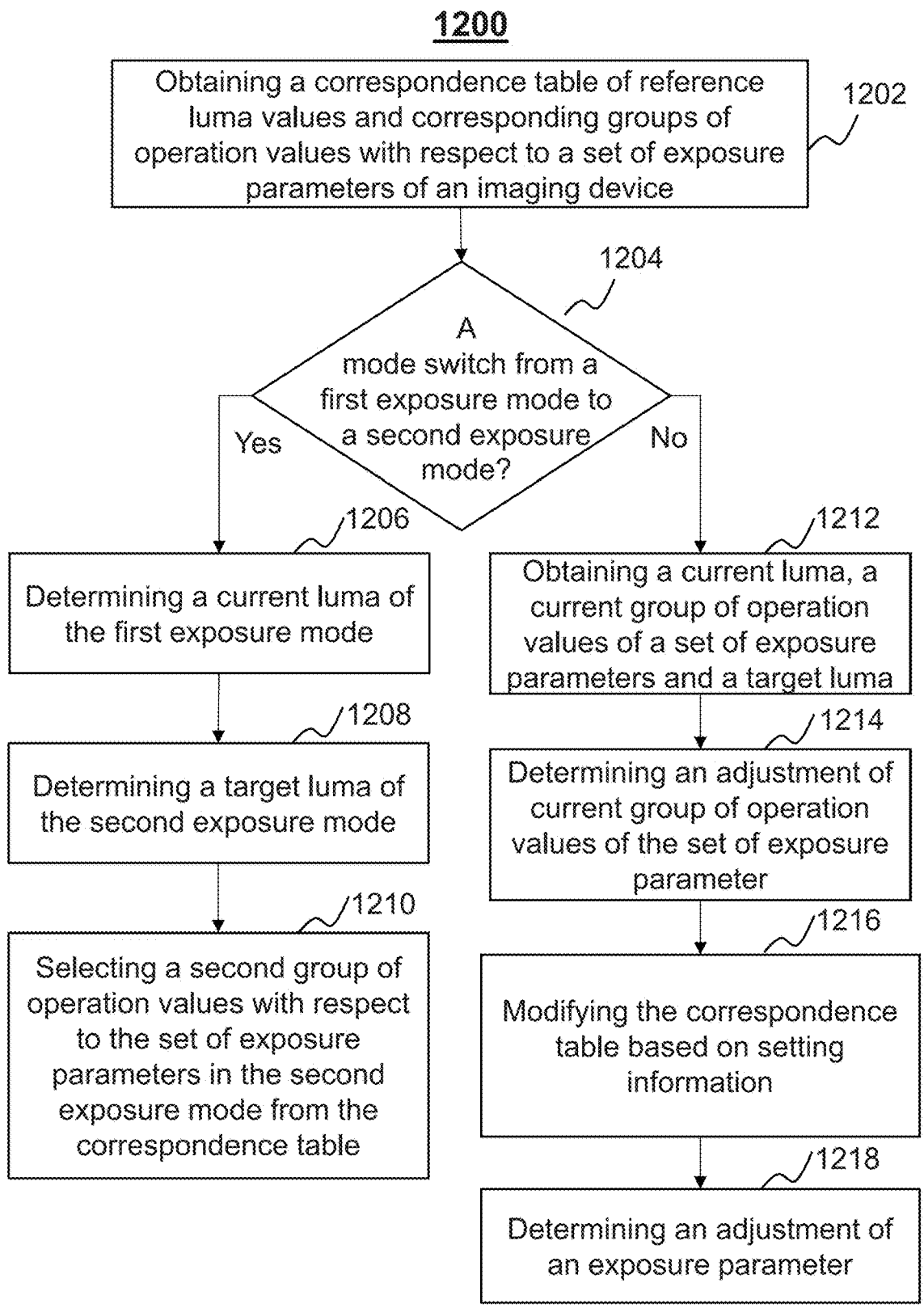
FIG. 12 is a flowchart illustrating an exemplary process for controlling the exposure setting of an imaging device according to some embodiments of the present disclosure.

FIG. 12 is a flowchart illustrating an exemplary process for controlling the exposure setting of an imaging device according to some embodiments of the present disclosure. In some embodiments, at least part of process 1200 may be performed by computing device 200 shown in FIG. 2.

In 1202, a correspondence table of reference luma values and corresponding groups of operation values with respect to a set of exposure parameters of an imaging device may be obtained. In some embodiments, the obtainment may be made by the acquisition module 310. The imaging device may have one or more exposure modes. The correspondence table of reference luma values and corresponding groups of operation values with respect to a set of exposure parameters may record corresponding relationships between reference luma values and groups of operation values with respect to the set of exposure parameters in one or more exposure modes. More descriptions regarding the correspondence table and exposure modes of the imaging device may be found elsewhere in the present disclosure. See, e.g., FIG. 3 and the relevant descriptions.

In 1204, a judgment may be made as to whether there is a mode switch of the imaging device from a first exposure mode to a second exposure mode. In some embodiments, 1202 may be performed by the determination module 320. If there is a mode switch from the first exposure mode to the second exposure mode, 1206 to 1210 may be performed. Otherwise, 1212 to 1218 may be performed.

In 1206, a current luma of the first exposure mode may be determined. In some embodiments, the determination may be made by the determination module 320. In some embodiments, the current luma of the first exposure mode may be determined based on a first group of operation values of a set of exposure parameters in the first exposure mode and the correspondence table.

In 1208, a target luma of the second exposure mode may be determined. In some embodiments, the determination may be made by the determination module 320. In some embodiments, the target luma of the second exposure mode may be determined based on the current luma of the first exposure mode.

In 1210, a second group of operation values with respect to the set of exposure parameters in the second exposure mode may be selected from the correspondence table. In some embodiments, the selection may be made by the determination module 320. In some embodiments, the set of exposure parameters in the second exposure mode may be determined based on the correspondence table and the target luma of the second exposure mode.

Operations 1206, 1208, and 1210 may be substantially similar to 506, 508, and 510 with reference to FIG. 5, respectively, and are not repeated here.

In 1212, a current luma, a current group of operation values of a set of exposure parameters and a target luma of the imaging device may be obtained. In some embodiments, the obtainment may be made by the acquisition module 310.

In 1214, an adjustment of current group of operation values of the set of exposure parameter may be determined. In some embodiments, the determination may be made by the determination module 320. In some embodiments, the adjustment of the current group of operation values of exposure parameters may be determined based on the current luma and the target luma.

In 1216, the correspondence table may be modified based on setting information (e.g., user setting information, etc.). In some embodiments, the modification may be made by be control module 330.

In 1218, an adjustment of an exposure parameter may be determined. In some embodiments, the determination may be made by the determination module 320. In some embodiments, the adjustment of an exposure parameter may be determined based on the adjustment of the current group of operation values of the set of exposure parameters and the modified correspondence table.

Operations 1212, 1214, 1216, and 1218 may be substantially similar to 1008, 1010, 1012, and 1014 with reference to FIG. 10, respectively, and are not repeated here.

It should be noted that the above descriptions of process 1200 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. For example, 1216 may be omitted and an adjustment of an exposure parameter based on the adjustment of the current group of operation values of exposure parameters and the correspondence table. As another example, process 1200 may include an additional operation to adjust the imaging device based the selected group of operation values of the set of exposure parameters of second exposure mode, or the adjustment of the operation values of the exposure parameter. However, those variations and modifications also fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python, or the like, conventional procedural programming languages, such as the "C" programming language, Visual Basic, Fortran 2003, Per, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one processor;
   at least one storage device storing a set of instructions, the set of instructions, when executed by the at least one processor, cause the system to:
   determine a target luma of an imaging device in an exposure mode, the imaging device having a set of exposure parameters;
   determine a current luma and a current group of operation values with respect to the set of exposure parameters of the imaging device in the exposure mode;
   determine a first adjustment of the current group of operation values of exposure parameters based on the current luma and the target luma;
   obtain a correspondence table relating to a plurality of reference luma values and a plurality of groups of operation values of the set of exposure parameters of the imaging device, a group of operation values of the set of exposure parameters of the imaging device corresponding to one of the plurality of reference luma values;
   obtain setting information of the imaging device;
   modify the correspondence table based on the setting information; and
   determine, based on the first adjustment and the modified correspondence table, a second adjustment of at least one of the set of exposure parameters of the imaging device.

2. The system of claim 1, wherein the imaging device includes at least one exposure mode of an auto exposure mode, a gain priority mode, a shutter priority mode, an aperture priority mode, or an anti-ghosting mode.

3. The system of claim 1, wherein the set of exposure parameters of the imaging device include at least one of a gain, a shutter speed, or an aperture size.

4. The system of claim 1, wherein the system is further caused to:
   determine normalized values of the current group of operation values with respect to the set of exposure parameters of the imaging device;
   determine a sum of the normalized values of the current group of operation values with respect to the set of exposure parameters;
   determine a normalized value associated with the target luma based on the first adjustment and the sum of the normalized values of the current group of operation values with respect to the set of exposure parameters; and
   identify the at least one exposure parameter to be adjusted based on the modified correspondence table and the normalized value associated with the target luma.

5. The system of claim 4, wherein to determine normalized values of the current group of operation values with respect to the set of exposure parameters of the imaging device, the system is further caused to:
   obtain a plurality of groups of operation values with respect to the set of exposure parameters of the imaging device;

normalize each operation value of the plurality of groups of operation values; and determine the normalized values of the operation values in the current group based on the each normalized operation value of the plurality of groups of operation values.

6. The system of claim 1, wherein the setting information includes a variation range of at least one of the set of exposure parameters.

7. The system of claim 1, wherein the system is further caused to:

adjust, based on the second adjustment, the at least one of the set of exposure parameters of the imaging device.

8. A method implemented on a computing device having at least one processor and at least one storage device, the method comprising:

determining a target luma of an imaging device in an exposure mode, the imaging device having a set of exposure parameters;

determining a current luma and a current group of operation values with respect to the set of exposure parameters of the imaging device in the exposure mode;

determining a first adjustment of the current group of operation values of exposure parameters based on the current luma and the target luma;

obtaining a correspondence table relating to a plurality of reference luma values and a plurality of groups of operation values of the set of exposure parameters of the imaging device, a group of operation values of the set of exposure parameters of the imaging device corresponding to one of the plurality of reference luma values;

obtaining setting information of the imaging device;

modifying the correspondence table based on the setting information; and determining, based on the first adjustment and the modified correspondence table, a second adjustment of at least one of the set of exposure parameters of the imaging device.

9. The method of claim 8, wherein the imaging device includes at least one exposure mode of an auto exposure mode, a gain priority mode, a shutter priority mode, an aperture priority mode, or an anti-ghosting mode.

10. The method of claim 8, wherein the set of exposure parameters of the imaging device include at least one of a gain, a shutter speed, or an aperture size.

11. The method of claim 8, further comprising:

determining normalized values of the current group of operation values with respect to the set of exposure parameters of the imaging device;

determining a sum of the normalized values of the current group of operation values with respect to the set of exposure parameters;

determining a normalized value associated with the target luma based on the first adjustment and the sum of the normalized values of the current group of operation values with respect to the set of exposure parameters; and identifying the at least one exposure parameter to be adjusted based on the modified correspondence table and the normalized value associated with the target luma.

12. The method of claim 11, wherein the determining normalized values of the current group of operation values with respect to the set of exposure parameters of the imaging device comprises:

obtaining a plurality of groups of operation values with respect to the set of exposure parameters of the imaging device;

normalizing each operation value of the plurality of groups of operation values; and determining the normalized values of the operation values in the current group based on the each normalized operation value of the plurality of groups of operation values.

13. The method of claim 8, wherein the setting information includes a variation range of at least one of the set of exposure parameters.

14. The method of claim 8, wherein the method further comprises:

adjusting, based on the second adjustment, the at least one of the set of exposure parameters of the imaging device.

15. A non-transitory computer readable medium, comprising a set of instructions, wherein when executed by at least one processor, the set of instructions direct the at least one processor to effectuate a method, the method comprising:

determining a target luma of an imaging device in an exposure mode, the imaging device having a set of exposure parameters;

determining a current luma and a current group of operation values with respect to the set of exposure parameters of the imaging device in the exposure mode;

determining a first adjustment of the current group of operation values of exposure parameters based on the current luma and the target luma;

obtaining a correspondence table relating to a plurality of reference luma values and a plurality of groups of operation values of the set of exposure parameters of the imaging device, a group of operation values of the set of exposure parameters of the imaging device corresponding to one of the plurality of reference luma values;

obtaining setting information of the imaging device;

modifying the correspondence table based on the setting information; and determining, based on the first adjustment and the modified correspondence table, a second adjustment of at least one of the set of exposure parameters of the imaging device.

16. The non-transitory computer readable medium of claim 15, wherein the imaging device includes at least one exposure mode of an auto exposure mode, a gain priority mode, a shutter priority mode, an aperture priority mode, or an anti-ghosting mode.

17. The non-transitory computer readable medium of claim 15, wherein the set of exposure parameters of the imaging device include at least one of a gain, a shutter speed, or an aperture size.

* * * * *